United States Patent
Takada et al.

(10) Patent No.: US 10,049,232 B2
(45) Date of Patent: Aug. 14, 2018

(54) REWRITE DETECTION SYSTEM, REWRITE DETECTION DEVICE AND INFORMATION PROCESSING DEVICE

(71) Applicants: NATIONAL UNIVERSITY CORPORATION NAGOYA UNIVERSITY, Nagoya-shi, Aichi (JP); AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hiroaki Takada, Nagoya (JP); Hiroki Takakura, Nagoya (JP); Yukihiro Miyashita, Yokkaichi (JP); Satoshi Horihata, Yokkaichi (JP); Hiroshi Okada, Yokkaichi (JP); Naoki Adachi, Yokkaichi (JP)

(73) Assignees: NATIONAL UNIVERSITY CORPORATION NAGOYA UNIVERSITY, Nagoya (JP); AUTONETWORKS TECHNOLOGIES LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 164 days.

(21) Appl. No.: 14/917,352

(22) PCT Filed: Sep. 12, 2014

(86) PCT No.: PCT/JP2014/074188
§ 371 (c)(1),
(2) Date: Mar. 8, 2016

(87) PCT Pub. No.: WO2015/041161
PCT Pub. Date: Mar. 26, 2015

(65) Prior Publication Data
US 2016/0224806 A1     Aug. 4, 2016

(30) Foreign Application Priority Data

Sep. 20, 2013  (JP) .................................. 2013-195647

(51) Int. Cl.
*G06F 21/64* (2013.01)
*H04L 12/40* (2006.01)

(52) U.S. Cl.
CPC ..... *G06F 21/64* (2013.01); *H04L 2012/40215* (2013.01); *H04L 2012/40273* (2013.01)

(58) Field of Classification Search
CPC ........... G06F 21/64; H04L 2012/40215; H04L 2012/40279; H04L 2012/40273
See application file for complete search history.

(56) References Cited

U.S. PATENT DOCUMENTS

| 8,209,084 B2 | 6/2012 | Fujinaga |
| 9,132,790 B2 | 9/2015 | Miyake |

(Continued)

FOREIGN PATENT DOCUMENTS

| CN | 101053200 A | 10/2007 |
| JP | 2005-182509 A | 7/2005 |

(Continued)

OTHER PUBLICATIONS

Dec. 13, 2016 Office Action issued in Japanese Patent Application No. 2013-195647.

(Continued)

*Primary Examiner* — Ellen Tran
(74) *Attorney, Agent, or Firm* — Oliff PLC

(57) ABSTRACT

A rewrite detection system, a rewrite detection device and an information processing device can detect unauthorized rewrite to a program or data stored in a storage unit of the information processing device. A rewrite detection device generates a random seed and transmits it to an ECU and a server device. The ECU calculates a hash value using a predetermined hash function on the basis of the received random seed and the storage content of the storage unit, and transmits the hash value to the rewrite detection device. The (Continued)

server device transmits an expectation in response to an inquiry from the rewrite detection device. The rewrite detection device determines whether unauthorized rewrite to a program or data in the ECU has been performed or not in accordance with whether the expectation received from the server device and the hash value received from the ECU coincide with each other or not.

19 Claims, 15 Drawing Sheets

(56) References Cited

U.S. PATENT DOCUMENTS

| | | | |
|---|---|---|---|
| 2005/0190619 A1* | 9/2005 | Wakiyama | G11C 7/24 365/201 |
| 2007/0028115 A1* | 2/2007 | Kober | G06F 21/572 713/180 |
| 2007/0156638 A1 | 7/2007 | Vadekar et al. | |
| 2008/0016576 A1 | 1/2008 | Ueda et al. | |
| 2011/0119556 A1* | 5/2011 | de Buen | H04L 41/12 714/758 |
| 2012/0243585 A1 | 9/2012 | Matsui et al. | |
| 2014/0343787 A1* | 11/2014 | Mabuchi | B60W 50/04 701/31.7 |

FOREIGN PATENT DOCUMENTS

| | | |
|---|---|---|
| JP | 2007-276657 A | 10/2007 |
| JP | 2008-541211 A | 11/2008 |
| JP | 2009-043085 A | 2/2009 |
| JP | 2011-108167 A | 6/2011 |
| JP | 2013-017140 A | 1/2013 |
| JP | 2013-060047 A | 4/2013 |
| KR | 2000-0076682 A | 12/2000 |

OTHER PUBLICATIONS

Dec. 29, 2016 Office Action issued in Chinese Patent Application No. 201480051281.1.
Dec. 2, 2014 Search Report issued in International Patent Application No. PCT/JP2014/074188.
Oct. 19, 2017 Office Action issued in U.S. Appl. No. 15/514,267.
Nov. 17, 2015 Search Report issued in International Patent Application No. PCT/JP2015/075814.

* cited by examiner

FIG. 6

REWRITE DETECTION DATABASE

| VEHICLE MODEL | ECU CLASS | RANDOM SEED | EXPECTATION |
|---|---|---|---|
| VEHICLE MODEL A | ECUa | 0000h | 13A8h |
| | | ⋮ | ⋮ |
| | | FFFFh | 7E11h |
| | ECUb | 0000h | B44Ch |
| | | ⋮ | ⋮ |
| | | FFFFh | 9266h |
| | ⋮ | ⋮ | ⋮ |
| VEHICLE MODEL B | …… | …… | …… |
| ⋮ | ⋮ | ⋮ | ⋮ |

FIG. 7

REWRITE DETECTION DATABASE

| VEHICLE MODEL | ECU CLASS | STORAGE CONTENT |
|---|---|---|
| VEHICLE MODEL A | ECUa | ...... |
| | ECUb | ...... |
| | ⋮ | ⋮ |
| VEHICLE MODEL B | ...... | ...... |
| ⋮ | ⋮ | ⋮ |

REWRITE DETECTION SYSTEM, REWRITE DETECTION DEVICE AND INFORMATION PROCESSING DEVICE

CROSS-REFERENCE TO RELATED APPLICATION

This application is the national phase under 35 U.S.C. § 371 of PCT International Application No. PCT/JP2014/074188 which has an International filing date of Sep. 12, 2014 and designated the United States of America.

The present invention relates to: a rewrite detection system, which detects unauthorized rewrite to a program or data in an information processing device such as an ECU (Electronic Control Unit) mounted on a vehicle; a rewrite detection device and an information processing device, which act as a component of the system.

BACKGROUND

In an information processing device such as an ECU mounted on a vehicle, a processing unit such as a CPU (Central Processing Unit) performs various processing on the basis of a program and data stored in a storage unit such as a ROM (Read Only Memory). In recent vehicles, a function is put into practical use to rewrite a program or data stored in a storage unit of an information processing device via an in-vehicle network such as a CAN (Controller Area Network). This facilitates version upgrading or the like of software in an information processing device, and facilitates implement of functionalization of the information processing device.

Patent Document 1 proposes an onboard network system provided with a configuration management device for authenticating an onboard control device, the configuration management device being configured to distribute configuration certification data to be used for configuration certification to an onboard control device via a registration device connected with an onboard network.

[Patent Document 1] Japanese Patent Application Laid-Open No. 2013-17140

SUMMARY

In a configuration wherein a program and data stored in a storage unit of an information processing device are rewritable, unauthorized rewrite to the program and data may possibly be performed. For example, when an unspecified large number of users utilize a vehicle by car sharing, car rental or the like, a malicious user may possibly perform unauthorized rewrite. Moreover, for example, a user can illegally modify his own vehicle.

An idea to prevent unauthorized rewrite to a program or data in a storage unit is to mount a high-level authentication function, an encryption function or the like on an information processing device, for example. However, mounting such a function on an information processing device has a problem of causing a cost increase of the information processing device. Moreover, it is not easy to completely prevent unauthorized rewrite. The onboard network system described in Patent Document 1 also has a similar problem.

The present invention has been made in view of such a situation, and an object thereof is to provide a rewrite detection system, a rewrite detection device and an information processing device, which can detect unauthorized rewrite to a program or data stored in a storage unit of the information processing device.

A rewrite detection system according to the present invention is a rewrite detection system for checking an information processing device, which has a storage unit for storing a program or data, a processing unit for performing processing based on a program or data stored in the storage unit, and a communication unit for communicating with another device via a network, so as to detect rewrite to a program or data stored in the storage unit, characterized by comprising a rewrite detection device, which has: seed information transmission unit for transmitting seed information to the information processing device via the network; hash value reception unit for receiving a hash value transmitted from the information processing device in response to seed information transmitted by the seed information transmission unit; and hash value determination unit for determining whether a hash value received by the hash value reception unit is valid or not, and detects rewrite in accordance with a result of determination by the hash value determination unit, wherein the information processing device has hash value calculation unit for calculating a hash value based on seed information transmitted by the seed information transmission unit and a program or data stored in the storage unit, and is configured to transmit a hash value calculated by the hash value calculation unit to the rewrite detection device.

Moreover, the rewrite detection system according to the present invention is characterized in that the seed information transmission unit of the rewrite detection device transmits storage area specification information, which specifies a storage area in the storage unit, to the information processing device together with the seed information, and the hash value calculation unit of the information processing device is configured to calculate a hash value on the basis of the seed information and a program or data stored in a storage area in the storage unit, which is specified by the storage area specification information transmitted together with the seed information.

Moreover, the rewrite detection system according to the present invention is characterized in that the seed information transmission unit is configured to transmit the storage area specification information including information which specifies a head position of a storage area, and a tail position or a size of the storage area.

Moreover, the rewrite detection system according to the present invention is characterized in that a plurality of discontinuous areas can be specified as the storage area, and the seed information transmission unit is configured to transmit the storage area specification information including information which specifies the plurality of areas.

Moreover, the rewrite detection system according to the present invention is characterized in that the storage area specification information is information which specifies an interval between the plurality of areas.

Moreover, the rewrite detection system according to the present invention is characterized in that the information processing device is configured not to transmit a hash value to the rewrite detection device when specification of a storage area by the storage area specification information received together with the seed information does not satisfy a predetermined condition.

Moreover, the rewrite detection system according to the present invention is characterized in that the information processing device is configured not to transmit a hash value to the rewrite detection device when a size of a storage area specified by the storage area specification information is neither a predetermined size nor a size of a constant multiple of the predetermined size.

Moreover, the rewrite detection system according to the present invention is characterized in that the information processing device decides a storage area in the storage unit to be an object of hash value calculation on the basis of seed information transmitted by the seed information transmission unit, and the hash value calculation unit is configured to calculate a hash value on the basis of a program or data stored in the storage area decided on the basis of seed information.

Moreover, the rewrite detection system according to the present invention is characterized in that the information processing device is configured not to transmit a hash value until a predetermined period of time elapses after transmitting a hash value to the rewrite detection device.

Moreover, the rewrite detection system according to the present invention is characterized in that the storage unit stores random data in a surplus area other than a storage area where the program or data is stored.

Moreover, the rewrite detection system according to the present invention is characterized in that the rewrite detection device has measurement unit for measuring a period of time from transmission of seed information by the seed information transmission unit to reception of a hash value by the hash value reception unit, and is configured to detect rewrite in accordance with a period of time measured by the measurement unit.

Moreover, the rewrite detection system according to the present invention is characterized in that the seed information transmission unit is configured to transmit a random value as the seed information.

Moreover, the rewrite detection system according to the present invention is characterized by further comprising a server device having transmission unit for transmitting an expectation of the hash value for the seed information, wherein the rewrite detection device has: inquiry unit for making an inquiry for an expectation of the hash value for the seed information to the server device; and reception unit for receiving the expectation transmitted from the server device for the inquiry from the inquiry unit, and the hash value determination unit is configured to determine whether a hash value received by the hash value reception unit is valid or not on the basis of an expectation received by the reception unit.

Moreover, the rewrite detection system according to the present invention is characterized by further comprising a server device having transmission unit for transmitting the seed information and an expectation of a hash value, wherein the rewrite detection device has: inquiry unit for making an inquiry for the seed information and the expectation to the server device; and reception unit for receiving the seed information and the expectation transmitted from the server device for the inquiry from the inquiry unit, the seed information transmission unit is configured to transmit the seed information, which has been received by the reception unit from the server device, to the information processing device, and the hash value determination unit is configured to determine whether a hash value received by the hash value reception unit is valid or not on the basis of an expectation received by the reception unit.

Moreover, the rewrite detection system according to the present invention is characterized in that the rewrite detection device is mounted on a mobile body, and, when communication with the server device can be made, causes the inquiry unit to make an inquiry, causes the reception unit to receive the expectation, and stores the received expectation, and the hash value determination unit is configured to determine whether a hash value received by the hash value reception unit is valid or not on the basis of the stored expectation.

Moreover, the rewrite detection system according to the present invention is characterized in that the rewrite detection device is mounted on a mobile body, and, when communication with the server device can be made, causes the inquiry means to make an inquiry, causes the reception means to receive the expectation, and stores the received expectation, and the hash value determination means is configured to determine whether a hash value received by the hash value reception means is valid or not on the basis of the stored expectation.

Moreover, the rewrite detection system according to the present invention is characterized in that the rewrite detection device is mounted on a mobile body.

Moreover, the rewrite detection system according to the present invention is characterized in that the rewrite detection device is configured to be attachable to and detachable from the network.

Moreover, a rewrite detection device according to the present invention is a rewrite detection device for detecting rewrite to a program or data stored in a storage unit of another device, characterized by comprising: seed information transmission unit for transmitting seed information to said another device via a network; hash value reception unit for receiving a hash value transmitted from said another device in response to seed information transmitted by the seed information transmission unit; and hash value determination unit for determining whether a hash value received by the hash value reception unit is valid or not, wherein rewrite is detected in accordance with a result of determination by the hash value determination unit.

Moreover, an information processing device according to the present invention is an information processing device characterized by comprising: a storage unit for storing a program or data; a processing unit for performing processing based on a program or data stored in the storage unit; a communication unit for communicating with another device via a network; and hash value calculation unit for calculating a hash value based on seed information transmitted from another device and a program or data stored in the storage unit, wherein a hash value calculated by the hash value calculation unit is transmitted to the another device.

In the present invention, a rewrite detection device generates seed information and transmits the seed information to an information processing device, and the information processing device calculates a hash value on the basis of received seed information and a program or data stored in a storage unit and transmits the hash value to the rewrite detection device. As seed information, a random value having a predetermined number of bits can be generated and used, for example. The rewrite detection device determines whether a hash value received from the information processing device is valid or not, and determines whether unauthorized rewrite to a program or data has been performed or not. That is, the rewrite detection device can determine that unauthorized rewrite has not been performed when the hash value is valid, or can determine that unauthorized rewrite has been performed when the hash value is invalid.

This makes it possible to detect unauthorized rewrite to a program or data in the information processing device, and to appropriately carry out treatment such as operation stop, repair or replacement of an information processing device for which unauthorized rewrite has been performed. Since added to the information processing device is only the function to calculate a hash value, it is possible to suppress a cost increase of the information processing device for implementing the system. This system can be implemented more easily and at a lower cost than a case where a function to prevent unauthorized rewrite is mounted.

Moreover, in the present invention, in the process of transmitting seed information to the information processing device, the rewrite detection device transmits storage area specification information, which specifies an area in the storage unit to be the object of hash value calculation, together. The information processing device calculates a hash value on the basis of a program or data stored in a storage area specified by the storage area specification information.

When many programs or much data is stored in the storage unit and the throughput of the information processing device is low, hash value calculation may possibly require a long period of time in a case where the whole storage unit is to be processed. Therefore, by causing the information processing device to calculate a hash value only for a part of the storage unit, it becomes possible to shorten a period of time required for processing of calculating a hash value. It is to be noted that the rewrite detection device may acquire a hash value a plurality of times from the information processing device and determine whether unauthorized rewrite has been performed or not while changing the object area of hash value calculation.

Moreover, in the present invention, the storage area specification information includes information, which specifies the head position and the tail position of the storage area, or information, which specifies the head position and the size of the storage area. This allows the rewrite detection device to specify a part of the storage unit of the information processing device as a storage area to be the object of hash value calculation in a manner such as "from address X to address Y" or "Y bytes from address X".

Moreover, the storage area to be the object of hash value calculation is not necessarily one continuous area in the storage unit, but a plurality of discontinuous areas may be specified as the storage area. In such a case, the storage area specification information can be information, which specifies the interval of a plurality of areas, for example. This allows the rewrite detection device to specify a plurality of storage areas in the storage unit of the information processing device as the object area of hash value calculation in a manner such as "at address interval Z (or Z byte)".

It is to be noted that it is also possible to specify a storage area using any combination thereof in a manner such as "from address X to address Y at address interval Z".

Moreover, in the present invention, the information processing device decides a storage area to be the object of hash value calculation on the basis of seed information from the rewrite detection device, calculates a hash value on the basis of the storage content of the storage area, and transmits the hash value to the rewrite detection device. This shortens a period of time required for calculation processing of a hash value by the information processing device, and also prevents increase in information to be transmitted from the rewrite detection device to the information processing device.

In a configuration wherein a hash value can be calculated for a part of the storage area as described above, a malicious user or the like may possibly specify a minute area, repeatedly acquire a hash value, and analyze each acquired hash value, so that a program or data stored in the storage unit is decoded.

Therefore, in the present invention, the information processing device is configured not to transmit a hash value when storage area specification information is given from the rewrite detection device and specification of a storage area does not satisfy a predetermined condition. As the predetermined condition, whether the size of a specified storage area is one of a predetermined size and a size of a constant multiple of a predetermined size or not can be determined, for example. This makes it difficult to decode a program or data on the basis of a hash value, which has been acquired in an unauthorized manner.

Moreover, in the present invention, after a hash value is calculated on the basis of seed information from the rewrite detection device and transmitted to the rewrite detection device, the information processing device does not transmit a hash value until a predetermined period of time elapses even when next seed information is given from the rewrite detection device. This limits the amount of hash values to be obtained in a certain period of time, and therefore makes it difficult to acquire a hash value in an unauthorized manner and decode a program or data.

For example, unauthorized processing may possibly be performed by compressing an authorized program or authorized data stored in the storage unit and storing an unauthorized program or unauthorized data in an unused area (area where any program or any data is not stored) of the storage unit to be obtained by the compression.

Therefore, in the present invention, random data is stored in a surplus area where any program or any data is not stored in a case where an authorized program or authorized data is stored in the storage unit. This makes it difficult to compress a program or data stored in the storage unit.

It is to be noted that a program or data may be stored in the storage unit so that surplus areas lie scattered, and random data to be written in a surplus area may lie scattered in the storage unit.

In order to compress a program or data and perform unauthorized processing as described above, an unauthorized program needs to calculate a valid hash value on the basis of an authorized program or authorized data which has been compressed in the process of calculating a hash value in response to a request from the rewrite detection device, and such processing requires a longer period of time than normal hash value calculation processing.

Therefore, in the present invention, a period of time from transmission of seed information by the rewrite detection device to reception of a hash value is measured, and the rewrite detection device determines that unauthorized rewrite has been (or may have been) performed when the measured period of time is longer than a preset threshold or the like.

Moreover, in the present invention, a server device stores an expectation of a hash value for seed information, and the rewrite detection device acquires an expectation from the server device. Alternatively, a server device may store an authorized program or authorized data, and the server device may be configured to calculate an expectation for seed information. The rewrite detection device makes an inquiry for an expectation of a hash value for seed information, which has been transmitted to the information processing device, to the server device, and receives an expectation transmitted from the server device in response to the inquiry. The rewrite detection device compares the expectation received from the server device with the hash value received from the information processing device, and can determine that unauthorized rewrite has been performed when the values do not coincide with each other.

For example, in a configuration wherein the rewrite detection device stores an expectation, the stored expectation may possibly be rewritten in an unauthorized manner. A configuration wherein the rewrite detection device acquires an expectation from the server device can prevent unauthorized rewrite to an expectation, and can enhance accuracy in rewrite detection of a program or data in the information processing device.

Moreover, the server device transmits the seed information and the expectation to the rewrite detection device, and the rewrite detection device transmits the seed information, which has been acquired from the server device, to the information processing device. In response, the information processing device calculates a hash value and transmits the hash value to the rewrite detection device, and the rewrite detection device may be configured to determine whether unauthorized rewrite has been performed or not on the basis of the hash value from the information processing device and the expectation from the server device.

Moreover, in the present invention, the rewrite detection device is mounted on a vehicle. For example, a gateway, a car navigation system or the like mounted on a vehicle may have the function of the rewrite detection device. This makes it easy to increase the frequency of detection processing by performing detection processing of unauthorized rewrite each time the engine of the vehicle starts, for example.

Here, when a rewrite detection device is mounted on a vehicle, the rewrite detection device is not always communicable with a server device. Therefore, the rewrite detection device preliminarily acquires and stores an expectation of a hash value from the server device. In a case where the rewrite detection device is not communicable with the server device in the process of detection processing, the rewrite detection device can perform detection processing using a stored expectation.

Moreover, in the present invention, the rewrite detection device is configured to be attachable to and detachable from an in-vehicle network. For example, the rewrite detection device may be a portable device, and can be configured to be communicable with the information processing device via an in-vehicle network when being connected with a connector of the vehicle via a cable or the like.

Such a rewrite detection device may be provided in a dealer shop, a maintenance shop or the like of a vehicle, for example, so that unauthorized rewrite to a program or data in an information processing device can be detected in the process of safety inspection, periodic inspection, repair or the like of the vehicle. Moreover, in the case of a vehicle for car rental, car sharing or the like, for example, the rewrite detection device can perform unauthorized rewrite detection after the vehicle is returned.

With the present invention, a rewrite detection device can detect unauthorized rewrite to a program or data stored in a storage unit of an information processing device.

The above and further objects and features will more fully be apparent from the following detailed description with accompanying drawings.

BRIEF DESCRIPTION OF DRAWINGS

FIG. 6 is a schematic diagram for illustrating First Configuration Example of a rewrite detection database.

FIG. 7 is a schematic diagram for illustrating Second Configuration Example of a rewrite detection database.

DETAILED DESCRIPTION

Embodiment 1

System Configuration

Figure 1:
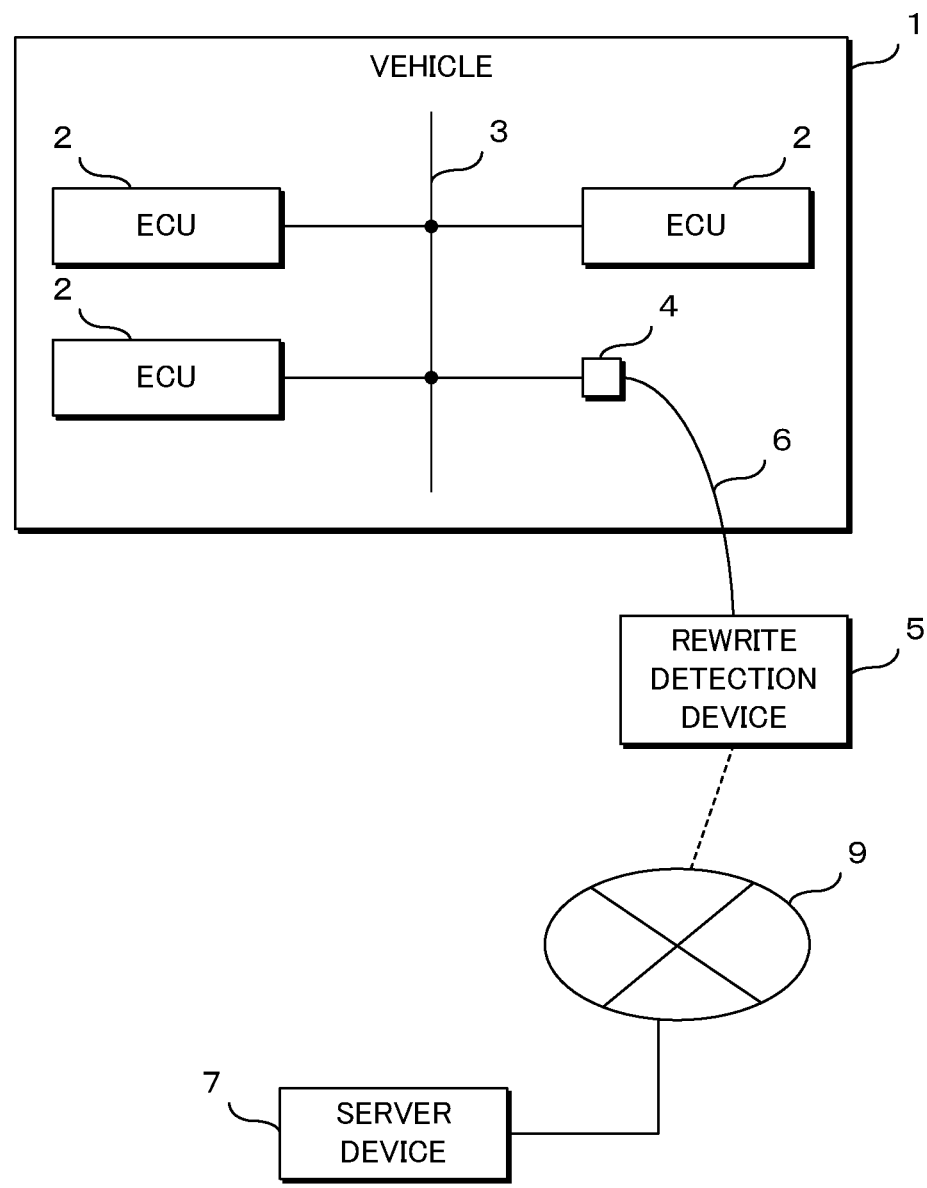
FIG. 1 is a schematic diagram for illustrating the configuration of a rewrite detection system according to Embodiment 1.

The following description will give a specific explanation on the present invention with reference to the drawings for illustrating embodiments thereof. FIG. 1 is a schematic diagram for illustrating the configuration of a rewrite detection system according to Embodiment 1. Denoted at 1 in the drawings is a vehicle, and various ECUs 2 such as a body ECU and an engine ECU, for example, are mounted on the vehicle 1. A plurality of ECUs 2 mounted on the vehicle 1 are connected with each other via an in-vehicle network 3 such as a CAN so as to transmit and receive information to and from each other. The vehicle 1 is also provided with a connector 4 to be used for connecting the in-vehicle network 3 with another device.

The rewrite detection system according to Embodiment 1 is provided with a rewrite detection device 5 for detecting unauthorized rewrite to a program or data in the ECUs 2 mounted on the vehicle 1. The rewrite detection device 5 is a portable device, and is stored in a dealer shop, a repair shop or the like of the vehicle 1, for example. The rewrite detection device 5 becomes communicable with the ECUs 2 via the in-vehicle network 3 when being connected with the connector 4 provided in the vehicle 1 via a communication cable 6. The rewrite detection device 5 performs detection processing of unauthorized rewrite to a program or data in an ECU 2 in a state where the communication cable 6 is connected with the connector 4.

The rewrite detection device 5 also has a function to make wireless communication utilizing a wireless LAN (Local Area Network), a portable telephone network or the like.

The rewrite detection device 5 in this embodiment utilizes such a wireless communication function to communicate with a server device 7 via a network 9 such as the Internet. The server device 7 is a device to be managed and administered by a manufacturing company, a sales company or the like of the vehicle 1, for example. The server device 7 stores information to be used for rewrite detection processing to be performed by the rewrite detection device 5, and transmits required information to the rewrite detection device 5 in response to a request to be given from the rewrite detection device 5 in the process of rewrite detection processing.

Figure 2:
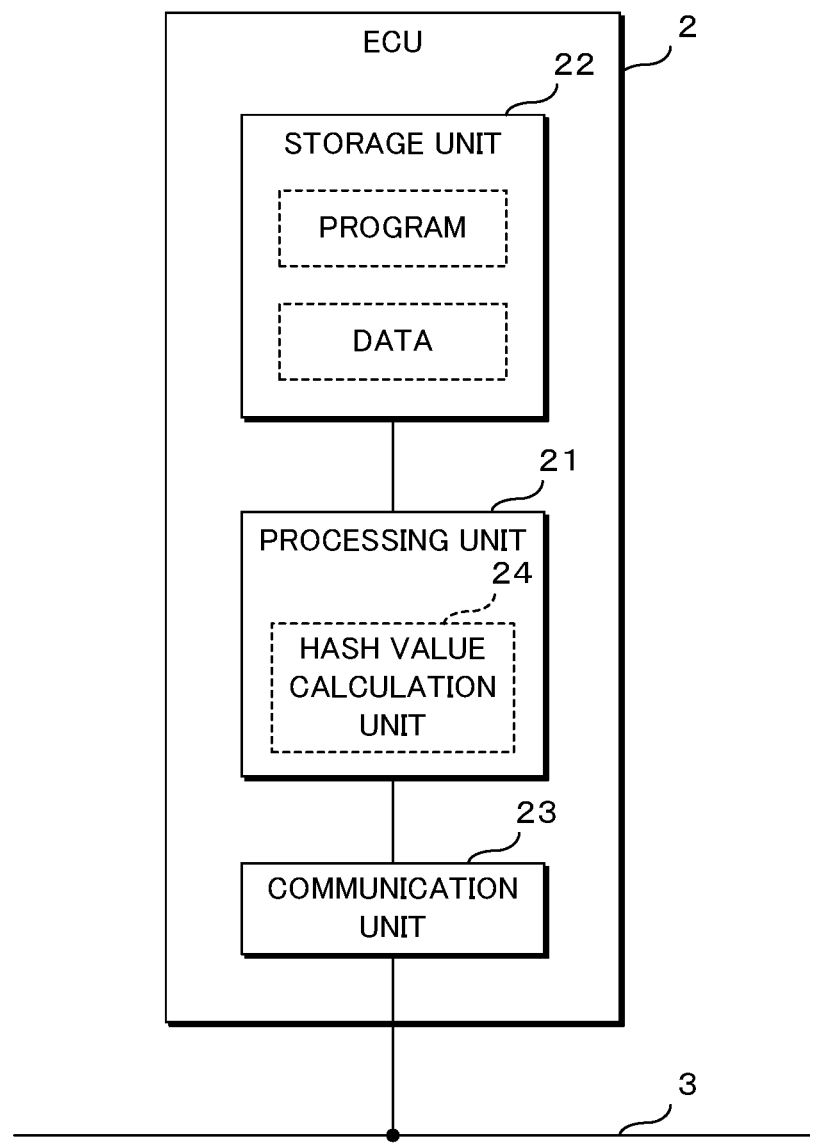
FIG. 2 is a block diagram for illustrating the configuration of an ECU.

FIG. 2 is a block diagram for illustrating the configuration of an ECU 2. The ECU 2 is composed of a processing unit 21, a storage unit 22, a communication unit 23 and the like. The processing unit 21 is constituted of an arithmetic processing unit such as a CPU (Central Processing Unit). The processing unit 21 reads out and executes a program stored in the storage unit 22 to perform various information processing related to the vehicle 1.

The storage unit 22 is constituted of a nonvolatile and data-rewritable memory element such as a flash memory or an EEPROM (Electrically Erasable Programmable Read Only Memory). The storage unit 22 stores a program to be executed by the processing unit 21, and various data to be used for processing to be performed by the program. In this embodiment, the storage unit 22 is used as a ROM, and a program or data stored in the storage unit 22 shall not be rewritten in processing by the processing unit 21. Here, rewrite for version upgrading or the like of a program can be achieved.

The communication unit 23 communicates with another ECU 2 via the in-vehicle network 3 according to a communication protocol such as a CAN, for example. The communication unit 23 converts information for transmission given from the processing unit 21 into a transmission signal according to a communication protocol, and outputs the signal acquired by conversion to a communication line which constitutes the in-vehicle network 3 so as to transmit the information to another ECU 2. The communication unit 23 samples the electrical potential of the communication line of the in-vehicle network 3 so as to acquire a signal outputted from another ECU 2, converts the signal into binary information according to a communication protocol so as to receive information, and gives the received information to the processing unit 21.

The processing unit 21 of the ECU 2 in this embodiment also has a hash value calculation unit 24 for calculating a hash value in response to an instruction from the rewrite detection device 5. The hash value calculation unit 24 calculates a hash value using a predetermined hash calculation algorithm (hash function) on the basis of a random seed (seed information) given from the rewrite detection device 5, and a program or data stored in the storage unit 22. The hash value calculation unit 24 may be implemented as software, or may be implemented as hardware. Details of a hash value calculation method will be described later.

Figure 3:
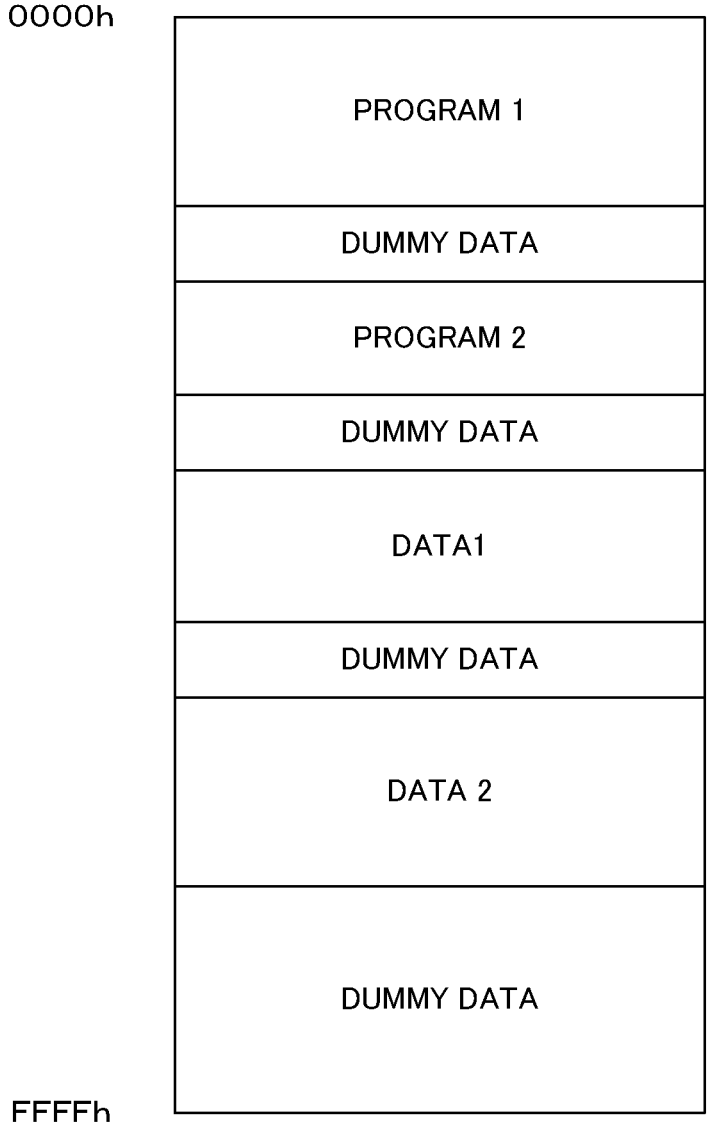
FIG. 3 is a schematic diagram for illustrating the configuration of a storage unit of an ECU.

FIG. 3 is a schematic diagram for illustrating the configuration of the storage unit 22 of an ECU 2. In the illustrated example, the storage unit 22 has storage areas, each having an address from 0000h to FFFFh. The storage unit 22 stores two programs (Program 1 and Program 2) to be executed by the processing unit 21, and two kinds of data (Data 1 and Data 2) to be respectively used for the execution of the programs. The storage unit 22 stores Program 1, Program 2, Data 1 and Data 2 in this order from the head side of the addresses, and dummy data is stored in storage areas therebetween and in a storage area on the tail side of the addresses.

Dummy data may be any value, and a value decided randomly, for example, can be stored. Dummy data is written in all surplus areas in the storage unit 22. That is, some data is stored in the whole storage area in the storage unit 22. This prevents unauthorized processing by storing an unauthorized program in a surplus area in the storage unit 22. This also makes it difficult to compress a program and data stored in the storage unit 22.

Figure 4:
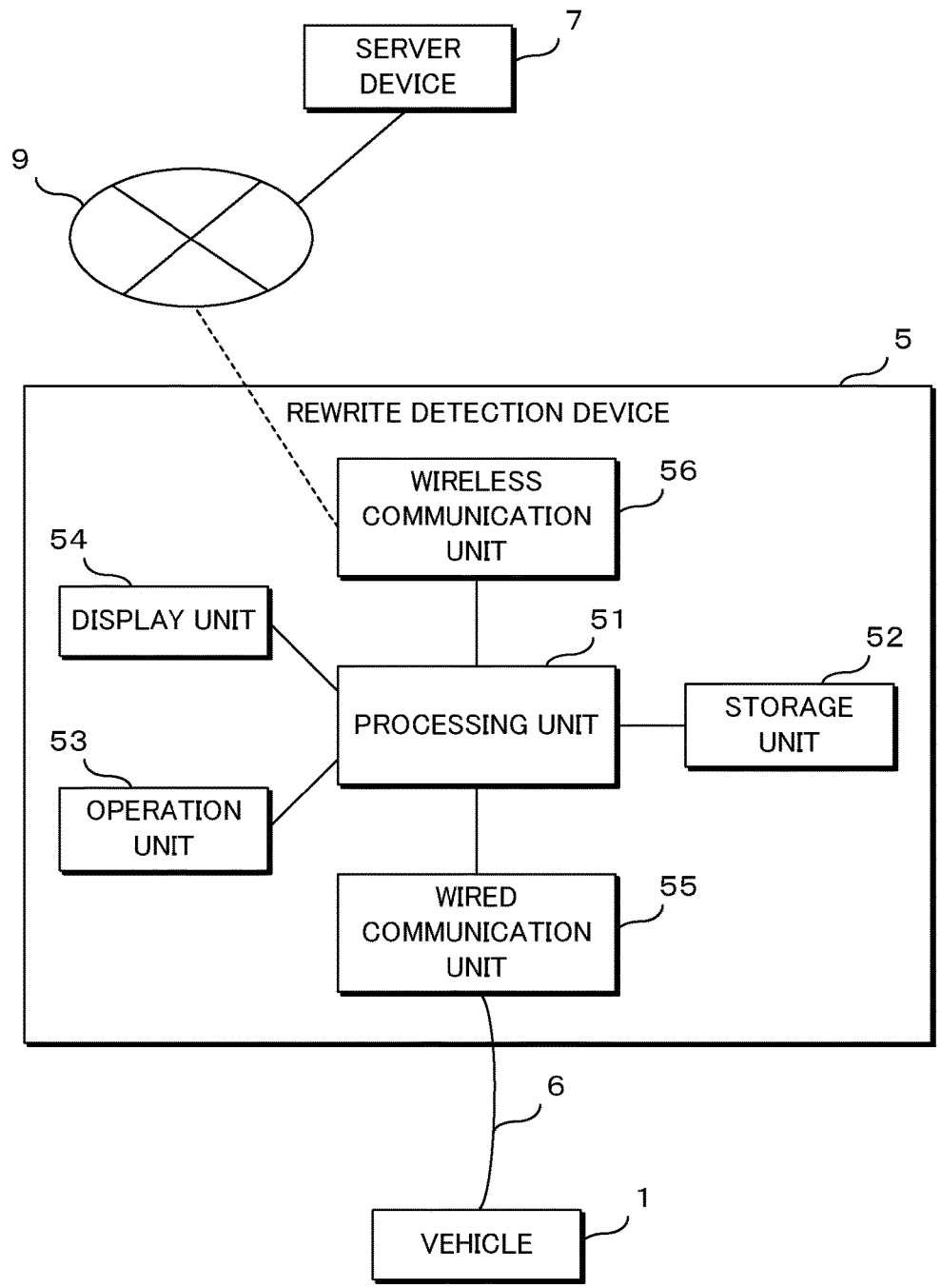
FIG. 4 is a block diagram for illustrating the configuration of a rewrite detection device.

FIG. 4 is a block diagram for illustrating the configuration of the rewrite detection device 5. The rewrite detection device 5 is composed of a processing unit 51, a storage unit 52, an operation unit 53, a display unit 54, a wired communication unit 55, a wireless communication unit 56 and the like. The processing unit 51 is constituted of an arithmetic processing unit such as a CPU. The processing unit 51 reads out and executes a program stored in the storage unit 52 so as to perform detection processing of unauthorized rewrite to a program or data in the ECUs 2 mounted on the vehicle 1. The storage unit 52 is constituted of a nonvolatile memory element such as a flash memory, and stores a program to be executed by the processing unit 51, and various data to be used for the execution. The rewrite detection device 5 may store temporary information, which is generated in a process stage or the like of the processing unit 51, or may be provided with a RAM (Random Access Memory) for storing temporary information.

The operation unit 53 is constituted of a push switch, a touch panel or the like, and accepts operation by the user and gives notice to the processing unit 51. The display unit 54 is constituted of a liquid crystal panel or the like, and displays various images, messages and the like for the user in response to an instruction from the processing unit 51. The wired communication unit 55 communicates with another device via the communication cable 6 according to a communication protocol such as a CAN, for example. When the communication cable 6 is connected with the connector 4 of the vehicle 1, the wired communication unit 55 becomes communicable with the ECUs 2 via the in-vehicle network 3 of the vehicle 1. The wireless communication unit 56 makes wireless communication utilizing a wireless LAN, a portable telephone network or the like, so as to communicate with the server device 7 via the network 9 such as the Internet.

Figure 5:
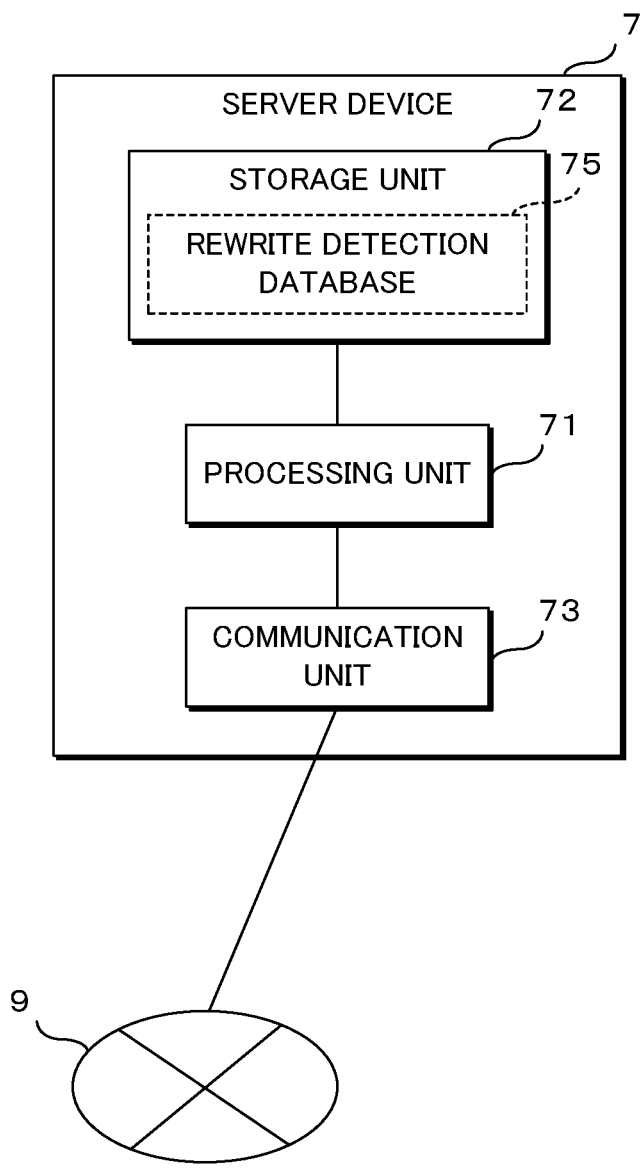
FIG. 5 is a block diagram for illustrating the configuration of a server device.

FIG. 5 is a block diagram for illustrating the configuration of the server device 7. The server device 7 is composed of a processing unit 71, a storage unit 72, a communication unit 73 and the like. The processing unit 71 is constituted of an arithmetic processing unit such as a CPU. The processing unit 71 reads out and executes a program stored in the storage unit 72 so as to perform processing to transmit information to be used for rewrite detection processing by the rewrite detection device 5. The communication unit 73 is to communicate with another device via the network 9 such as the Internet. The communication unit 73 in this embodiment communicates with the rewrite detection device 5, gives information received from the rewrite detection device 5 to the processing unit 71, and transmits information for transmission given from the processing unit 71 to the rewrite detection device 5.

The storage unit 72 is constituted of a mass storage device such as a hard disk. In this embodiment, a rewrite detection database 75 is constructed in the storage unit 72. The rewrite detection database 75 is a database which stores information to be used for rewrite detection processing by the rewrite detection device 5. The following description will illustrate two configuration examples of the rewrite detection database 75, though there are several possible configurations for the rewrite detection database 75.

FIG. 6 is a schematic diagram for illustrating First Configuration Example of the rewrite detection database 75. In the rewrite detection database 75 of First Configuration Example, "Vehicle Model", "ECU Class", "Random Seed" and "Expectation" are stored in association with each other. As "Vehicle Model" in the rewrite detection database 75, identification information or the like to be used for identifying the type of the vehicle 1 or the like is stored. When vehicles 1 have different grades and different configurations of ECUs 2 mounted thereon, the vehicles 1 are treated as different vehicle models in this embodiment even when the vehicles 1 have the same vehicle name, appearance and the like. In the illustrated example, information such as Vehicle Model A, Vehicle Model B, . . . is stored as "Vehicle Model" in the rewrite detection database 75. As "ECU Class" in the rewrite detection database 75, identification information or the like to be used for identifying the type of an ECU 2 such as a body ECU or an engine ECU, for example, is stored. In the illustrated example, information such as ECU a, ECU b, . . . is stored as "ECU Class" in the rewrite detection database 75.

"Random Seed" in the rewrite detection database 75 denotes a random seed to be generated by the rewrite detection device 5, and is a 4-digit hexadecimal numerical value in this embodiment. In the illustrated example, 65,536 different values from 0000h to FFFFh are set for each "ECU Class" as "Random Seed" in the rewrite detection database 75. "Expectation" in the rewrite detection database 75 is a hash value to be calculated for "Random Seed" by the ECU 2, and is a 4-digit hexadecimal numerical value in this embodiment. "Expectation" is stored after calculating a hash value using corresponding "Random Seed" for the storage content (program, data and dummy data) of the storage unit 22 of the ECU 2. It is to be noted that the illustrated "Expectations" are examples.

The rewrite detection device 5 specifies a vehicle model, an ECU class and a random seed, and makes an inquiry for an expectation to the server device 7. In response to the inquiry, the server device 7 reads out a corresponding expectation from the rewrite detection database 75, and transmits the expectation to the rewrite detection device 5.

FIG. 7 is a schematic diagram for illustrating Second Configuration Example of the rewrite detection database 75. In the rewrite detection database 75 of Second Configuration Example, "Vehicle Model", "ECU Class" and "Storage Content" are stored in association with each other. "Vehicle Model" and "ECU Class" thereamong are the same as those of First Configuration Example. "Storage Content" in the rewrite detection database 75 is a copy of the storage content of the storage unit 22 of the corresponding ECU 2.

As in the case of First Configuration Example, the rewrite detection device 5 specifies a vehicle model, an ECU class and a random seed, and makes an inquiry for an expectation to the server device 7. The server device 7 reads out the storage content corresponding to the vehicle model and the ECU class related to the inquiry. The server device 7 calculates a hash value on the basis of a random seed related to the inquiry and the read-out storage content, and transmits the calculated hash value to the rewrite detection device 5 as an expectation. Accordingly, the server device 7 stores the same hash function as that to be used by the hash value calculation unit 24 of the ECU 2.

In this embodiment, it is to be noted that programs and data stored in the storage unit 22 of the ECU 2 are deemed to be identical when the programs and data correspond to the same vehicle model and the same ECU class. Here, depending on a difference in the destination of the vehicle 1, the version of a program or the like, programs and data stored in the storage unit 22 can be deemed to be different from each other even when the programs and data correspond to the same vehicle model and the same ECU class. In such a case, an item such as the version of a program is provided in the rewrite detection database 75, for example, and a random seed and an expectation are stored for each version, or alternatively the storage content of the storage unit 22 is stored for each version. The rewrite detection device 5 acquires the version of a program of an ECU 2 to be the object of rewrite detection processing from the ECU 2, and transmits program version information together with information such as the random seed and the vehicle model in the process of making an inquiry for an expectation to the server device 7. The server device 7 can acquire or calculate an expectation from the rewrite detection database 75 on the basis of random seed information, vehicle model information, ECU class information, program version information and the like from the rewrite detection device 5, and transmit the expectation to the rewrite detection device 5.

<Hash Value Calculation Method>

The hash value calculation unit 24 of each ECU 2 can be configured to calculate a hash value utilizing a known hash function such as MD (Message Digest) 4, MD 5, SHA-1, SHA-256, SHA-384, SHA-512, EIPEMD-160 or SHA-3. These are so-called one-way hash functions, which respectively output one hash value for inputted information. Information to be inputted into a hash function is a part or the whole of programs or data stored in the storage unit 22 of the ECU 2 in this embodiment. The hash function can treat what has been inputted simply as binary information and calculate a hash value, whether any one of a program and data is inputted into the hash function or both of a program and data are inputted into the hash function. The hash value calculation unit 24 stores a preset hash function, and calculates a hash value using the hash function.

The following description will give a brief explanation on a case where the hash value calculation unit 24 calculates a hash value using a hash function of SHA-1. It is to be noted that explanation on detailed processing of the hash function of SHA-1 and on a case where the hash value calculation unit 24 uses another hash function will be omitted, since these hash functions are known techniques.

In a case where the hash function of SHA-1 is utilized, the hash value calculation unit 24 first performs padding. In padding, the hash value calculation unit 24 adjusts the size of information, which is to be processed, to be an integer multiple of a predetermined value (512 bit) by adding excess data behind inputted information. The hash value calculation unit 24 then divides the padded information into blocks for each 512 bit, and performs First Processing of calculating 80 values for each block.

The hash value calculation unit 24 then performs Second Processing of performing arithmetic operation using a value calculated by First Processing for an initial value having a predetermined size (160 bit) and obtaining a 160-bit value by the arithmetic operation as a hash value. In Second Processing, the hash value calculating unit 24 first performs arithmetic operation in 80 steps for the 160-bit initial value, using 80 values calculated for one block. As a result of the arithmetic operation in 80 steps, block information can be mixed into the 160-bit initial values, and a 160-bit value can be obtained as output. The hash value calculation unit 24 similarly performs arithmetic operation in 80 steps for the obtained 160-bit value as an initial value, using 80 values calculated for the next block. The hash value calculation unit 24 performs similar processing in 80 steps for all blocks, and finally obtains a 160-bit value as a hash value.

Moreover, in this embodiment, the hash value calculation unit 24 needs to calculate a hash value utilizing a random seed given from the rewrite detection device 5. For example, the hash value calculation unit 24 can use a random seed as data to be added to inputted information in the above padding. Moreover, for example, the hash value calculation unit 24 can use a random seed as a 160-bit initial value in Second Processing described above. In this embodiment, a random seed is used as an initial value of Second Processing.

It is to be noted that the way the hash value calculation unit 24 utilizes a random seed is not limited to what has been described above. For example, the hash value calculation unit 24 can utilize a logical operation value (e.g., exclusive OR) based on a random seed and information in the storage unit 22 to be the object of hash value calculation as information to be inputted into the hash function. Moreover, for example, the hash value calculation unit 24 can use what is obtained by adding a random seed at a predetermined position such as a head position or a tail position of information in the storage unit 22 to be the object of hash value calculation as information to be inputted into the hash function.

<Rewrite Detection Processing>

In the process of safety inspection, periodic inspection, repair or the like of the vehicle 1, for example, a worker at a dealer shop, a repair shop or the like connects the communication cable 6 of the rewrite detection device 5 with the connector 4 of the vehicle 1, so as to connect the rewrite detection device 5 with the in-vehicle network 3 of the vehicle 1. The worker operates the operation unit 53 of the rewrite detection device 5 so as to give an instruction to start detection processing of unauthorized rewrite to an ECU 2 of the vehicle 1 to the rewrite detection device 5.

When the operation unit 53 accepts an instruction to start unauthorized rewrite detection processing, the rewrite detection device 5 starts communication with the ECU 2 of the vehicle 1 at the wired communication unit 55. The rewrite detection device 5 in this embodiment arbitrarily selects one of a plurality of ECUs 2 mounted on the vehicle 1, and performs detection processing of unauthorized rewrite to a program and data stored in the storage unit 22 of the selected ECU 2. After finishing the detection processing for one ECU 2, the rewrite detection device 5 performs detection processing for an unprocessed ECU 2. The rewrite detection device 5 sequentially performs detection processing for a plurality of ECUs 2 by repeatedly performing the above processing, so as to perform unauthorized rewrite detection processing for all ECUs 2, which are mounted on the vehicle 1 and can be the object of detection.

It is to be noted that the rewrite detection device 5 can be configured to perform unauthorized rewrite detection processing simultaneously for a plurality of ECUs 2 connected with the in-vehicle network 3. Here, in this embodiment, the rewrite detection device 5 performs unauthorized rewrite detection processing sequentially for a plurality of ECUs 2 as described above. Moreover, the following description will explain a case where the rewrite detection 5 performs unauthorized rewrite detection processing for one ECU 2, in order to simplify the explanation. Similar processing may be repeatedly performed for a plurality of ECUs 2.

Figure 8:
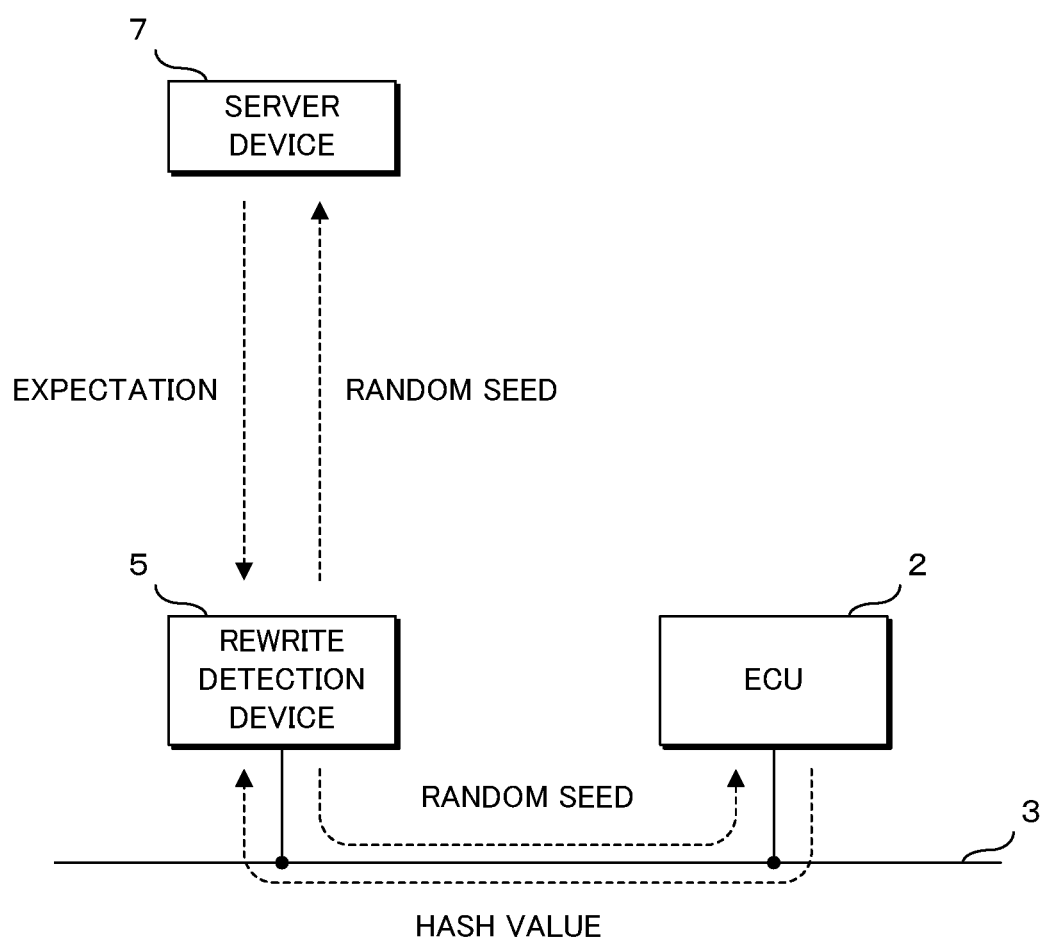
FIG. 8 is a schematic diagram for explaining rewrite detection processing to be performed by a rewrite detection device.

FIG. 8 is a schematic diagram for explaining rewrite detection processing to be performed by the rewrite detection device 5. The rewrite detection device 5 connected with the in-vehicle network 3 of the vehicle 1 gives notice of a start of rewrite detection processing or the like to an ECU 2, which is to be the object of rewrite detection processing. In response, the object ECU 2 suspends other processing, for example, so as to prepare for processing to be performed by the hash value calculation unit 24 (here, the other processing is not necessarily suspended but the hash value calculation unit 24 may be configured to perform processing in parallel with the other processing).

The rewrite detection device 5 generates a random value on the basis of an arbitrary random-number generation algorithm, and transmits the value to the ECU 2 as a random seed. The random seed may be a random value having 64 or more bits, for example. When the hash value calculation unit 24 uses SHA-1 as a hash function, the random seed can be 160-bit, for example. When receiving a random seed from the rewrite detection device 5, the ECU 2 calculates a hash value using a preset hash function on the basis of the received random seed and the storage content of the storage unit 22. The ECU 2 transmits the calculated hash value to the rewrite detection device 5.

Moreover, the rewrite detection device 5 transmits the generated random seed to the server device 7, and makes an inquiry for an expectation of a hash value for the random seed. At this time, the rewrite detection device 5 transmits vehicle information such as a vehicle ID (IDentifier) or the vehicle model of the vehicle 1, for which rewrite detection processing is performed, and ECU identification information such as an ID to be used for identifying an ECU 2 to be processed, to the server device 7 together with the random seed. When receiving these information, the server device 7 refers to the rewrite detection database 75 of the storage unit 72. The server device 7 acquires an expectation, for which an inquiry has been made, corresponding to the random seed, the vehicle model and the ECU class from the rewrite detection database 75, and transmits the acquired expectation to the rewrite detection device 5.

The rewrite detection device 5 compares the hash value received from the ECU 2 with the expectation received from the server device 7. When the hash value and the expectation coincide with each other, the rewrite detection device 5 determines that unauthorized rewrite to a program and data stored in the storage unit 22 of the ECU 2 has not been performed. On the other hand, when the hash value and the expectation do not coincide with each other, the rewrite detection device 5 determines that unauthorized rewrite to a program and data in the ECU 2 has been performed. The rewrite detection device 5 displays whether unauthorized processing has been performed or not at the display unit 54 as the result of rewrite detection processing.

The rewrite detection device 5 also measures a period of time from transmission of a random seed to the ECU 2 to reception of a hash value. The rewrite detection device 5 determines whether the measured period of time exceeds a threshold or not, and, when the measured period of time exceeds the threshold, determines that unauthorized rewrite to a program and data in the ECU 2 has been performed. It is to be noted that the threshold to be used for the determination is preliminarily decided in the design phase or the like of this system in consideration of the communication speed of the rewrite detection device 5 and the ECU 2, the throughput of the ECU 2, and the like.

Figure 9:
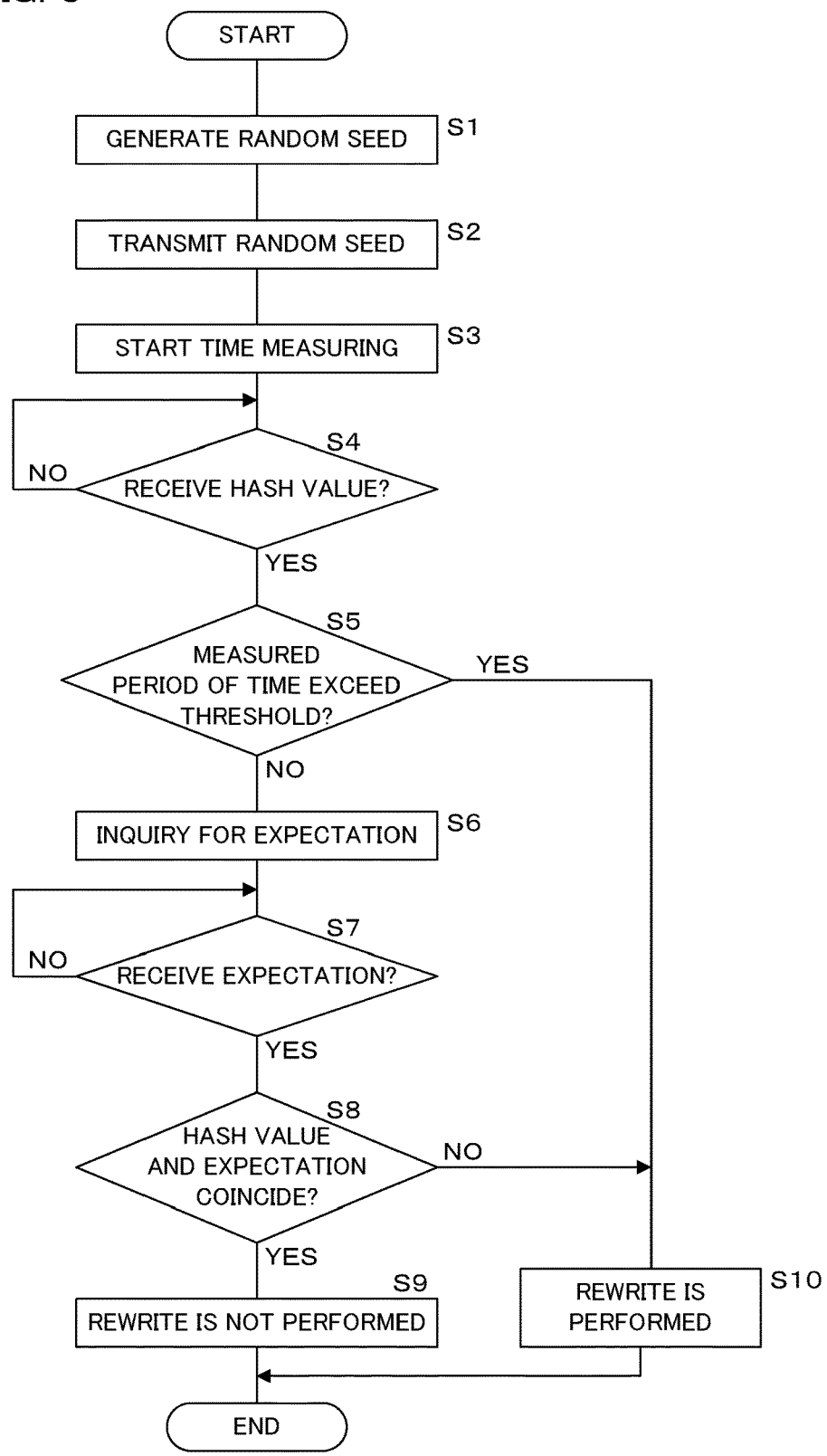
FIG. 9 is a flowchart for illustrating the process procedures of rewrite detection processing to be performed by a rewrite detection device.

FIG. 9 is a flowchart for illustrating the process procedures of rewrite detection processing to be performed by the rewrite detection device 5. The processing unit 51 of the rewrite detection device 5 generates a random seed on the basis of the random-number generation algorithm (step S1). The processing unit 51 transmits the generated random seed from the wired communication unit 55 to an ECU 2 to be processed (step S2). The processing unit 51 starts time measuring utilizing an inner timer or the like (step S3).

The processing unit 51 determines whether a hash value transmitted from the ECU 2 to be processed for the random seed has been received at the wired communication unit 55 or not (step S4), and, when a hash value has not been received (S4: NO), waits until a hash value is received. When a hash value is received (S4: YES), the processing unit 51 determines whether a measured period of time from transmission of the random seed to reception of the hash value exceeds a predetermined threshold or not (step S5). When the measured period of time exceeds the threshold (S5: YES), the processing unit 51 determines that unauthorized rewrite has been performed (step S10), displays notice thereof at the display unit 54, and terminates the processing.

When the measured period of time does not exceed the threshold (S5: NO), the processing unit 51 transmits a random seed, vehicle information and ECU identification information from the wireless communication unit 56 to the server device 7, and makes an inquiry for an expectation (step S6). The processing unit 51 determines whether an expectation transmitted from the server device 7 has been received for the inquiry or not (step S7), and, when an expectation has not been received (S7: NO), waits until an expectation is received.

When receiving an expectation from the server device 7 (S7: YES), the processing unit 51 determines whether the hash value received in step S4 and the expectation received in step S7 coincide with each other or not (step S8). When the hash value and the expectation coincide with each other (S8: YES), the processing unit 51 determines that unauthorized rewrite has not been performed (step S9), displays notice thereof at the display unit 54, and terminates the processing. When the hash value and the expectation do not coincide with each other (S8: NO), the processing unit 51 determines that unauthorized rewrite has been performed (step S10), displays notice thereof at the display unit 54, and terminates the processing.

Figure 10:
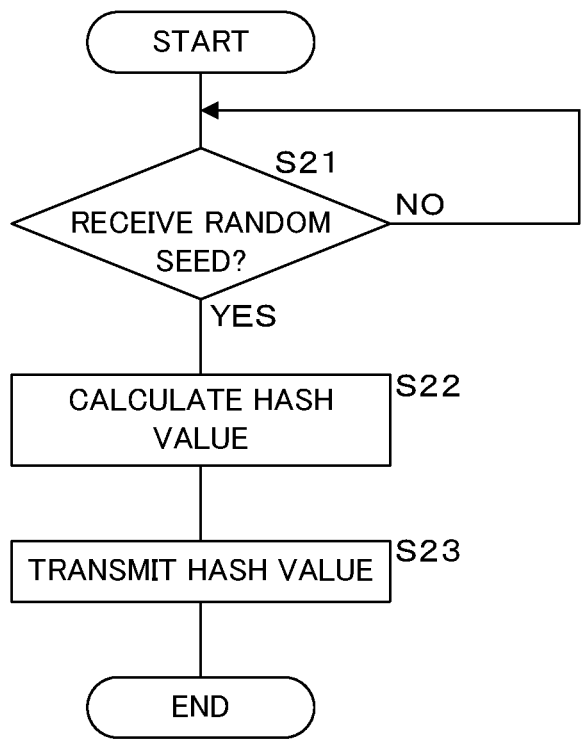
FIG. 10 is a flowchart for illustrating the process procedures of rewrite detection processing to be performed by an ECU.

FIG. 10 is a flowchart for illustrating the process procedures of rewrite detection processing to be performed by an ECU 2. The processing unit 21 of the ECU 2 determines whether a random seed transmitted from the rewrite detection device 5 has been received at the communication unit 23 or not (step S21), and, when a random seed has not been received (S21: NO), waits until a random seed is received. When a random seed is received (S21: YES), the hash value calculation unit 24 of the processing unit 21 calculates a hash value using a predetermined hash function on the basis of the random seed from the rewrite detection device 5 and the storage content of the storage unit 22 (step S22). The processing unit 21 transmits the hash value, which has been calculated by the hash value calculation unit 24, from the communication unit 23 to the rewrite detection device 5 (step S23), and terminates the processing.

Figure 11:
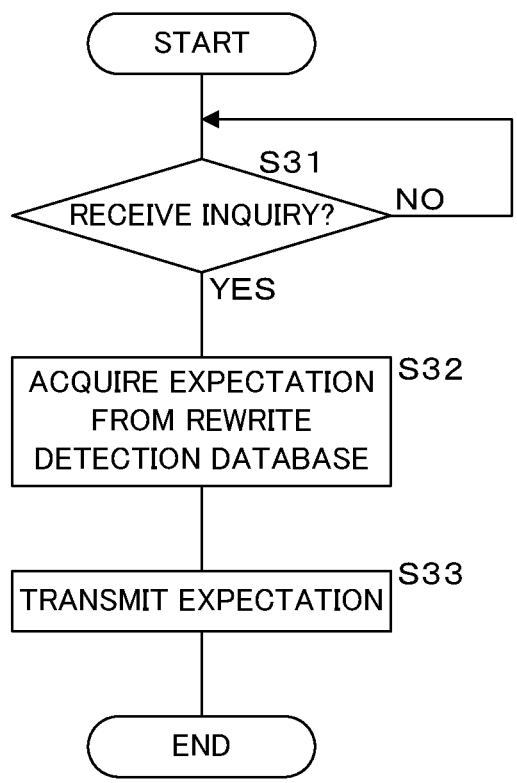
FIG. 11 is a flowchart for illustrating the process procedures of rewrite detection processing to be performed by a server device.

FIG. 11 is a flowchart for illustrating the process procedures of rewrite detection processing to be performed by the server device 7. The processing unit 71 of the server device 7 determines whether an inquiry for an expectation from the rewrite detection device 5 has been received at the communication unit 73 or not (step S31), and, when an inquiry has not been received (S31: NO), waits until an inquiry is received. When an inquiry from the rewrite detection device 5 is received (S31: YES), the processing unit 71 acquires an expectation from the rewrite detection database 75 of the storage unit 72 on the basis of a random seed, vehicle information, ECU identification information and the like included in the inquiry (step S32). The processing unit 71 transmits the acquired expectation from the communication unit 73 to the rewrite detection device 5 (step S33), and terminates the processing.

<Conclusion>

In the rewrite detection system according to Embodiment 1 having the above configuration, the rewrite detection device 5 generates a random seed and transmits the random seed to an ECU 2, and the ECU 2 calculates a hash value using a predetermined hash function on the basis of the received random seed and the storage content (program or data) of the storage unit 52 and transmits the hash value to the rewrite detection device 5. The rewrite detection device 5 determines whether the hash value received from the ECU 2 is valid or not, and determines whether unauthorized rewrite to a program or data has been performed or not. That is, the rewrite detection device 5 can determine that unauthorized rewrite has not been performed when the hash value is valid, or can determine that unauthorized rewrite has been performed when the hash value is invalid.

This allows the rewrite detection device 5 to detect unauthorized rewrite to a program or data in the ECU 2, and makes it possible to appropriately carry out treatment such as operation stop, repair or replacement of the ECU 2 for which unauthorized rewrite has been performed. Since added to the ECU 2 is only a function to calculate a hash value, it is possible to suppress a cost increase of the ECU 2 for implementing the system. This system can be implemented more easily and at a lower cost than a case where a function to prevent unauthorized rewrite is mounted.

Moreover, in the storage unit 22 of the ECU 2, dummy data having a random value is stored in a surplus area of a case where an authorized program and authorized data are stored. Although unauthorized processing may possibly be performed by compressing an authorized program or authorized data stored in the storage unit 22 and storing an unauthorized program or unauthorized data in an unused area of the storage unit 22 obtained by the compression, for example, it is possible to make it difficult to compress a program or data by prestoring dummy data in a surplus area. It is to be noted that a configuration wherein a program or data is stored in the storage unit 22 so that surplus areas lie scattered and dummy data lies scattered at a plurality of locations in the storage unit 22 makes it difficult to perform unauthorized processing.

Moreover, the rewrite detection device 5 measures a period of time from transmission of a random seed to an ECU 2 to reception of a hash value, and, when the measured period of time exceeds a preset threshold, determines that unauthorized rewrite has been (or may have been) performed. As a result, when unauthorized processing such as compressing and utilizing a program, data or the like in the ECU 2, for example, is performed and a longer period of time is required before transmission of a hash value than a normal state, this can be detected.

Moreover, the server device 7 transmits an expectation in response to an inquiry from the rewrite detection device 5, and the rewrite detection device 5 detects rewrite in accordance with whether the expectation received from the server device 7 and the hash value received from the ECU 2 coincide with each other or not. Although an expectation in the rewrite detection device 5 may possibly be rewritten in an unauthorized manner in a case where the rewrite detection device 5 is configured to store an expectation of a hash value, for example, a configuration wherein an expectation is acquired from the server device 7 prevents such unauthorized rewrite to an expectation.

Moreover, the rewrite detection device 5 is configured to be attachable to and detachable from the connector 4 of the in-vehicle network 3 of the vehicle 1 via the communication cable 6. Such a rewrite detection device 5 may be provided in a dealer shop, a maintenance factory or the like of the vehicle 1, for example, so that unauthorized rewrite to a program or data in the ECU 2 can be detected in the process of safety inspection, periodic inspection, repair or the like of the vehicle 1. Moreover, for example, in the case of a vehicle 1 for car rental, car sharing or the like, the rewrite detection device 5 can perform unauthorized rewrite detection after the vehicle is returned.

Although this embodiment has a configuration wherein communication between the rewrite detection device 5 and the vehicle 1 is made by wired communication via the communication cable 6, it is to be noted that this is not restrictive and the rewrite detection device 5 and the vehicle 1 may be configured to make wireless communication such as a wireless LAN. Moreover, although the rewrite detection device 5 is configured to communicate with the server device 7 at the wireless communication unit 56, this is not restrictive and the rewrite detection device 5 may be configured to communicate with the server device 7 by wired communication. Moreover, although the rewrite detection device 5 is configured to be connected with the connector 4 of the in-vehicle network 3 of the vehicle 1, this is not restrictive and the rewrite detection device 5 may be configured to be connected with a device such as a gateway mounted on the vehicle 1, for example, and communicate with an ECU 2 connected with the in-vehicle network 3 via the gateway.

Moreover, although the rewrite detection device 5 is configured to acquire an expectation from the server device 7 after acquiring a hash value from the ECU 2, this is not restrictive and the rewrite detection device 5 may acquire a hash value after acquiring an expectation or may acquire a hash value and an expectation in parallel. Moreover, although the rewrite detection device 5 is configured to detect unauthorized rewrite for a plurality of ECUs 2 mounted on the vehicle 1 one by one in sequence, this is not restrictive. The rewrite detection device 5 may simultaneously transmit a random seed to a plurality of ECUs 2 by broadcasting, for example, acquire hash values from the plurality of ECUs 2, and perform rewrite detection processing for the plurality of ECUs 2 at the same time.

Moreover, the rewrite detection database 75 may be provided not in the server device 7 but in the rewrite detection device 5. That is, the rewrite detection system may not be provided with the server device 7, and the rewrite detection device 5 may be configured to store or calculate an expectation for a hash value. Moreover, although this embodiment has been explained using an example of a rewrite detection system for detecting rewrite to a program or data in an ECU 2 mounted on the vehicle 1, this is not restrictive and a rewrite detection system may be configured to detect rewrite to a program or data in an information processing device, which is mounted on another mobile body such as an airplane or a ship, for example.
(Variation)

Although the rewrite detection system according to Embodiment 1 described above has a configuration wherein the rewrite detection device 5 generates a random seed, this is not restrictive. For example, the server device 7 may be configured to generate a random seed. In such a configuration, the rewrite detection device 5 makes an inquiry for transmission of a random seed and an expectation to the server device 7. In response to the inquiry, the server device 7 creates a random seed, acquires or calculates a corresponding expectation on the basis of the rewrite detection database 75, and transmits the random seed and the expectation to the rewrite detection device 5. The rewrite detection device 5 transmits a random seed, which has been received from the server device 7, to an ECU 2, receives a hash value, which has been calculated on the basis of the random seed, from the ECU 2, and compares the expectation from the server device 7 with the hash value from the ECU 2 so as to detect unauthorized rewrite.

Embodiment 2

In the rewrite detection system according to Embodiment 1 described above, the whole of the storage unit 22 of the ECU 2 is to be the object of hash value calculation by the hash value calculation unit 24. When the storage unit 22 of the ECU 2 has large storage capacity and the processing unit 21 has low throughput, for example, hash value calculation may possibly require a long period of time. Therefore, as a rewrite detection system according to Embodiment 2, a method of accelerating hash value calculation by an ECU 2 will be described below.

In the rewrite detection system according to Embodiment 2, the rewrite detection device 5 can specify a storage area in the storage unit 22 to be the object of hash value calculation by the hash value calculation unit 24 of an ECU 2. The rewrite detection device 5 can specify a storage area in a manner as "from address X to address Y at address interval Z" or "Y bytes from address X at address interval Z", for example. The rewrite detection device 5 transmits the above values X, Y and Z as storage area specification information to the ECU 2 together with a random seed. It is to be noted that the values X, Y and Z may be preset or may be randomly decided each time.

It is to be noted that a method of specifying a storage area is not limited to the above example. For example, a method of specifying one continuous area in a manner such as "from address X to address Y" may be employed. Moreover, for example, a method of specifying a plurality of discontinuous areas by not specifying the head position and the tail position but specifying only the interval between storage areas in a manner such as "at address interval Z" may be employed. Moreover, for example, a method of specifying a plurality of discontinuous areas by specifying a plurality of head positions and tail positions in a manner such as "from address X1 to address Y1, from address X2 to address Y2, . . . , from address Xn to address Yn" may be employed.

The rewrite detection device 5 may acquire a hash value corresponding to a part of the storage unit 22 of the ECU 2 as described above one time, so as to detect rewrite on the basis of one hash value. Alternatively, the rewrite detection device 5 may acquire a hash value a plurality of times while changing a specified storage area, so as to detect rewrite on the basis of a plurality of hash values. It is to be noted that the rewrite detection device 5 preferably acquires a hash value a plurality of times by specifying a storage area to cover the whole storage area of the storage unit 22.

When storage area specification information from the rewrite detection device 5 is given, the ECU 2 reads out data from a specified storage area, and the hash value calculation unit 24 calculates a hash value on the basis of the read-out data and the random seed from the rewrite detection device 5. The ECU 2 transmits the calculated hash value to the rewrite detection device 5.

Here, when specification of a storage area by the storage area specification information from the rewrite detection device 5 does not satisfy a predetermined condition, the ECU 2 does not calculate or transmit a hash value. For example, the ECU 2 uses a predetermined condition that the storage capacity of a specified storage area is a predetermined size such as A byte or a constant multiple of a predetermined size (e.g., N×A byte), for determining whether a hash value is to be transmitted or not.

Moreover, after transmitting a hash value to the rewrite detection device 5, the ECU 2 starts time measuring by an inner timer or the like, and does not transmit a hash value until a preset standby time elapses even when receiving the next random seed, area specification information and the like from the rewrite detection device 5. Since the ECU 2 sets such a limit on transmission of a hash value, it is possible to prevent abuse of the function of hash value calculation for partial data in the storage unit 22.

In the process of making an inquiry for an expectation to the server device 7, the rewrite detection device 5 also transmits storage area specification information (values X, Y and Z) to the server device 7 together with a random seed, vehicle information, ECU identification information and the like. The server device 7 acquires or calculates an appropriate expectation on the basis of these information given from the writing detection device 5, and transmits the expectation to the rewrite detection device 5.

In a case where the rewrite detection database 75 of the server device 7 is to preliminarily calculate and store an expectation as illustrated in FIG. 6, it is to be noted that the rewrite detection database 75 according to Embodiment 2 needs to store an expectation for each set of X, Y and Z which can be specified. In another case where the rewrite detection database 75 is to store the storage content of the storage unit 22 as illustrated in FIG. 7, the server device 7 according to Embodiment 2 can utilize a similar rewrite detection database 75. In such a case, the server device 7 may extract a required part from the storage content of the rewrite detection database 75 on the basis of the storage area specification information, which has been given from the rewrite detection device 5 together with the inquiry, so as to calculate a hash value.

The rewrite detection device 5 compares the hash value received from the ECU 2 with the expectation received from the server device 7, and, when the values coincide with each other, determines that unauthorized rewrite has not been performed, or, when the values do not coincide with each other, determines that unauthorized rewrite has been performed.

Figure 12:
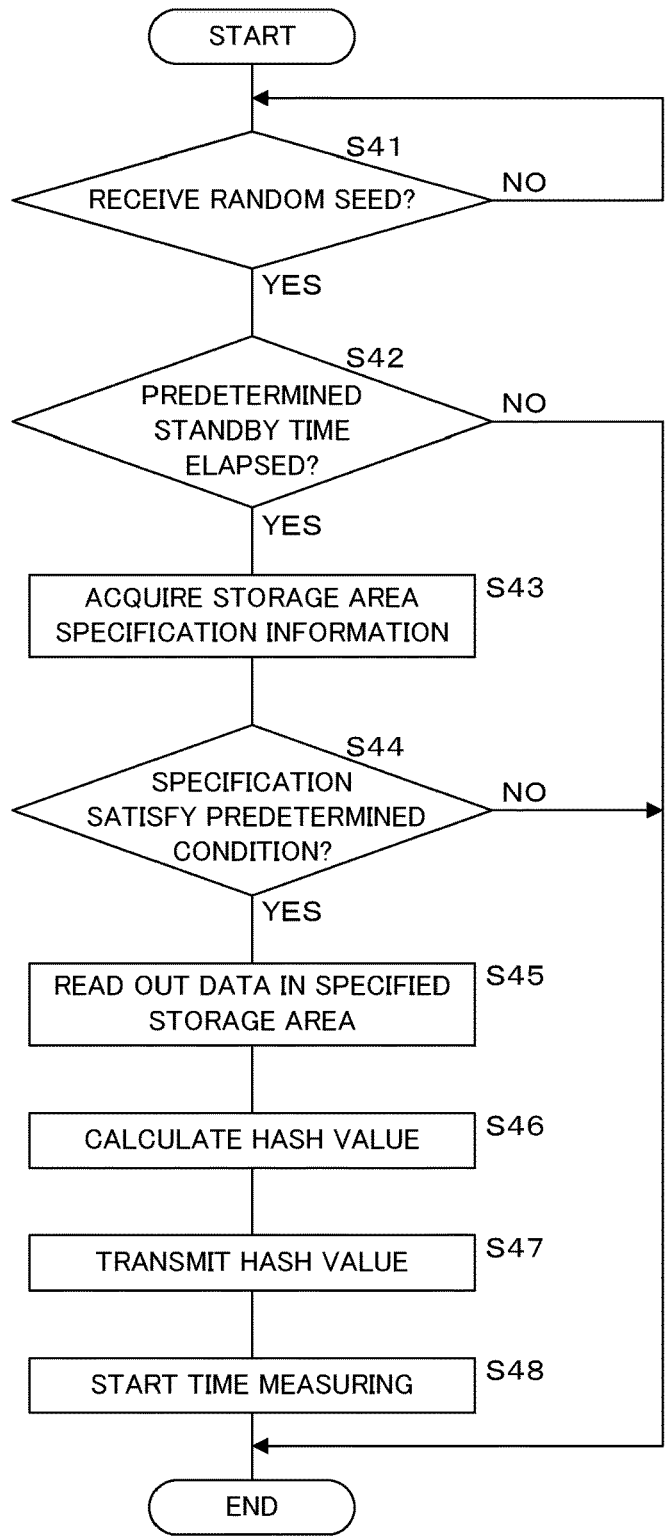
FIG. 12 is a flowchart for illustrating the process procedures of rewrite detection processing to be performed by an ECU according to Embodiment 2.

FIG. 12 is a flowchart for illustrating the process procedures of rewrite detection processing to be performed by an ECU 2 according to Embodiment 2. The processing unit 21 of the ECU 2 according to Embodiment 2 determines whether a random seed transmitted from the rewrite detection device 5 has been received at the communication unit 23 or not (step S41), and, when a random seed has not been received (S41: NO), waits until a random seed is received. When a random seed is received (S41: YES), the processing unit 21 determines whether a predetermined standby time has elapsed from transmission of the last hash value to the rewrite detection device 5 or not (step S42). When a standby time has not elapsed (S42: NO), the processing unit 21 terminates the processing.

When a predetermined standby time has elapsed from transmission of the last hash value (S42: YES), the processing unit 21 acquires storage area specification information, which has been received from the rewrite detection device 5 together with a random seed (step S43), and determines whether specification of a storage area by the storage area specification information satisfies a predetermined condition or not (step S44). When specification of a storage area does not satisfy the predetermined condition (S44: NO), the processing unit 21 terminates the processing. When specification of a storage area satisfies the predetermined condition (S44: YES), the processing unit 21 reads out data in the specified storage area (step S45).

The hash value calculation unit 24 of the processing unit 21 calculates a hash value using a predetermined hash function on the basis of the random seed from the rewrite detection device 5 and data in the specified storage area (step S46). The processing unit 21 transmits a hash value, which has been calculated by the hash value calculation unit 24, from the communication unit 23 to the rewrite detection device 5 (step S47). The processing unit 21 then starts time measuring using an inner timer or the like (step S48) in order to determine elapse of a standby time from transmission of a hash value, and terminates the processing.

It is to be noted that the process procedures of the server device 7 and the rewrite detection device 5 according to Embodiment 2 are omitted in illustration of the flowchart. The rewrite detection device 5 according to Embodiment 2 may transmit storage area specification information to the ECU 2 or the server device 7 in the process of transmitting a random seed to the ECU 2 in step S2 of the flowchart illustrated in FIG. 9, or in the process of making an inquiry for an expectation to the server device 7 in step S6. Moreover, the server device 7 according to Embodiment 2 may acquire an expectation in consideration of storage area specification information from the rewrite detection device 5 in the process of acquiring an expectation from the rewrite detection database in step S32 illustrated in FIG. 11.

In the rewrite detection system according to Embodiment 2 having the above configuration, the rewrite detection device 5 transmits storage area specification information, which specifies an area in the storage unit 22 to be the object of hash value calculation, together in the process of transmitting a random seed to the ECU 2. The ECU 2 calculates a hash value on the basis of a program or data stored in a storage area specified by the storage area specification information. This shortens a period of time required for hash value calculation processing by the ECU 2. It is to be noted that the rewrite detection device 5 may acquire a hash value a plurality of times from the ECU 2 so as to determine whether unauthorized rewrite has been performed or not, while changing the object area of hash value calculation.

Moreover, the storage area specification information may include information, which specifies the head position and the tail position of a storage area, or information, which specifies the head position and the size of the storage area. Moreover, a plurality of discontinuous areas may be specified as a storage area to be the object of hash value calculation, or the storage area specification information may be information which specifies the interval between a plurality of areas, for example. The rewrite detection device 5 can combine these information so as to specify a storage area in a manner such as "from address X to address Y at address interval Z", for example.

After calculating a hash value on the basis of a random seed and transmitting the hash value to the rewrite detection device 5, the ECU 2 does not transmit a hash value until a predetermined period of time elapses even when the next random seed is given from the rewrite detection device 5. This can limit the amount of hash values to be obtained in a certain period of time, and therefore makes it difficult to get a hash value in an unauthorized manner so as to decode a program or data.

Although Embodiment 2 has a configuration wherein the rewrite detection device 5 generates storage area specification information and transmits the storage area specification information to the ECU 2 and the server device 7, it is to be noted that this is not restrictive. For example, the ECU 2 and the server device 7 may be configured to store an arithmetic expression to be used for calculating the head position, the tail position, the interval and the like of storage areas on the basis of a random seed, so as to decide the head position, the tail position, the interval and the like of storage areas by receiving a random seed from the rewrite detection device 5 and performing an arithmetic operation using the arithmetic expression. In the case of such a configuration, a random seed may be used only for deciding a storage area and not be directly involved in hash value calculation.

Since the other configuration of the rewrite detection system according to Embodiment 2 is similar to the configuration of the rewrite detection system according to Embodiment 1, like codes are attached to similar components, and detailed explanation thereof will be omitted.

Embodiment 3

Although the rewrite detection systems according to Embodiments 1 and 2 described above have configurations wherein the rewrite detection device 5 is attachable to and detachable from the in-vehicle network 3 of the vehicle 1, this is not restrictive. In Embodiment 3, a configuration wherein the rewrite detection device 5 is mounted on the vehicle 1 will be explained.

Figure 13:
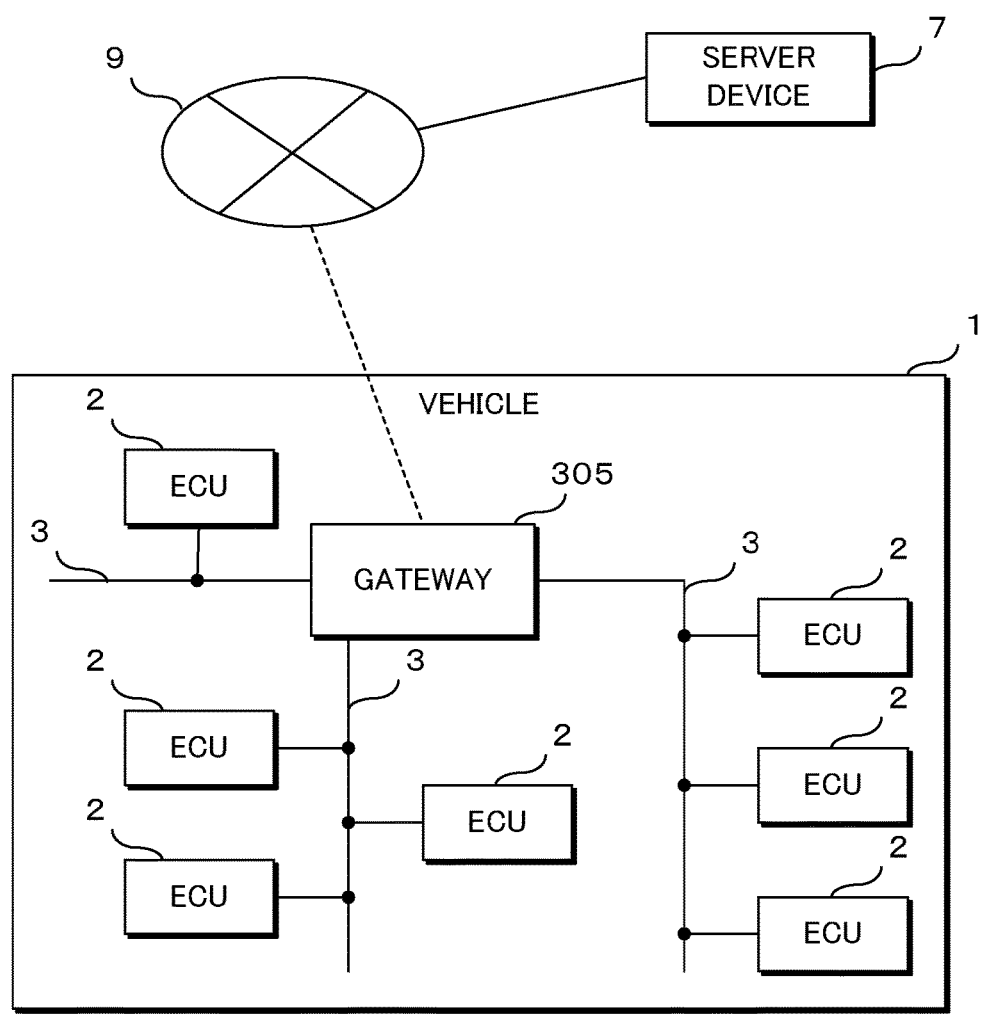
FIG. 13 is a schematic diagram for illustrating the configuration of a rewrite detection system according to Embodiment 3.

FIG. 13 is a schematic diagram for illustrating the configuration of a rewrite detection system according to Embodiment 3. The rewrite detection system according to Embodiment 3 has a configuration wherein a function to perform rewrite detection processing is provided in a gateway 305 mounted on the vehicle 1. The gateway 305 is connected with a plurality of communication lines which compose the in-vehicle network 3 of the vehicle 1, and performs processing to relay information transmission and reception between these communication lines. Moreover, the gateway 305 has a wireless communication function, and can communicate with the server device 7 utilizing the wireless communication function via the network 9 such as the Internet. Here, the gateway 305 may not have a wireless communication function, and the gateway 305 may be configured to communicate with the server device 7 utilizing a wireless communicator mounted on the vehicle 1.

Figure 14:
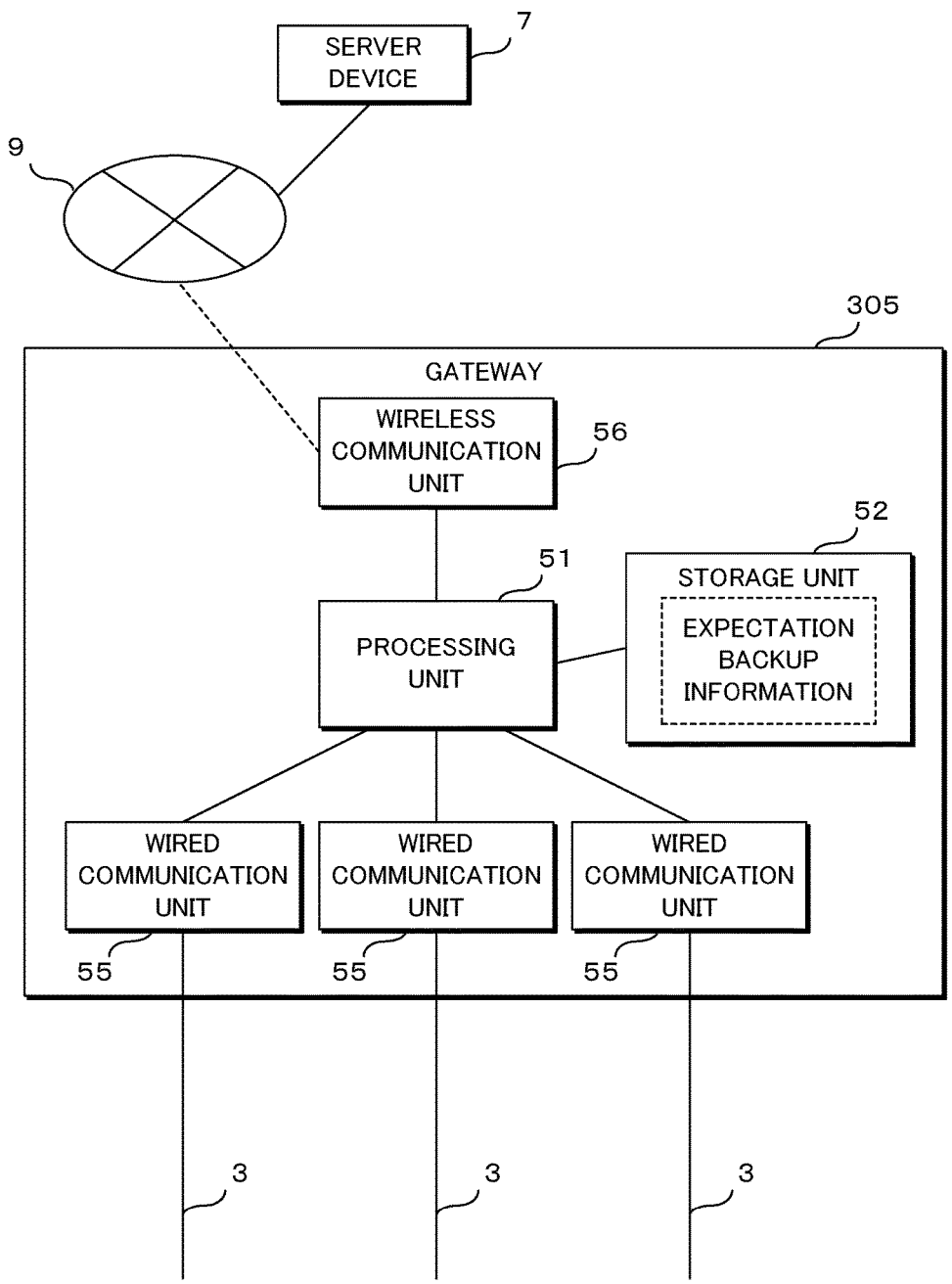
FIG. 14 is a block diagram for illustrating the configuration of a gateway.

FIG. 14 is a block diagram for illustrating the configuration of the gateway 305. The gateway 305 according to Embodiment 3 is composed of a processing unit 51, a storage unit 52, wired communication units 55, a wireless communication unit 56 and the like. The processing unit 51 is constituted of an arithmetic processing unit such as a CPU, and performs processing to relay transmission and reception of information between communication lines and also performs rewrite detection processing similar to that of the rewrite detection devices 5 of Embodiments 1 and 2. The storage unit 52 is constituted of a memory element such as a flash memory, and stores a program to be executed by the processing unit 51, data to be used for the execution, and the like. Moreover, in Embodiment 3, the storage unit 52 of the gateway 305 stores expectation backup information.

Moreover, the gateway 305 has a plurality of wired communication units 55, and each wired communication unit 55 is connected with a communication line of the in-vehicle network 3. The processing unit 51 acquires information received at one wired communication unit 55, and relays information by giving the information to the other wired communication units 55 so as to cause the same to transmit the information. The wireless communication unit 56 is to make wireless communication utilizing a wireless LAN, a portable telephone network or the like. Here, depending on the peripheral environment or the like of the vehicle 1, the gateway 305 cannot always make wireless communication using the wireless communication unit 56.

The gateway 305 performs rewrite detection processing in preset and predetermined timing such as when the ignition switch of the vehicle 1 is turned on, for example. When it is determined in rewrite detection processing that unauthorized rewrite to a program or data in the ECU 2 has been performed, the gateway 305 displays a warning message or the like at a display unit (illustration is omitted) provided near the driver seat of the vehicle 1. Moreover, the gateway 305 may perform processing such as prohibition of traveling of the vehicle 1 when unauthorized rewrite is performed.

Moreover, wireless communication of the wireless communication unit 56 with the server device 7 cannot always be made as described above. Therefore, the gateway 305 stores information related to an expectation, which has been acquired from the server device 7 while wireless communication can be made, in the storage unit 52 as expectation backup information. When communication with the server device 7 cannot be made in the process of rewrite detection processing, the gateway 305 determines whether a hash value obtained from the ECU 2 is valid or not on the basis of the expectation backup information stored in the storage unit 52.

Figure 15:
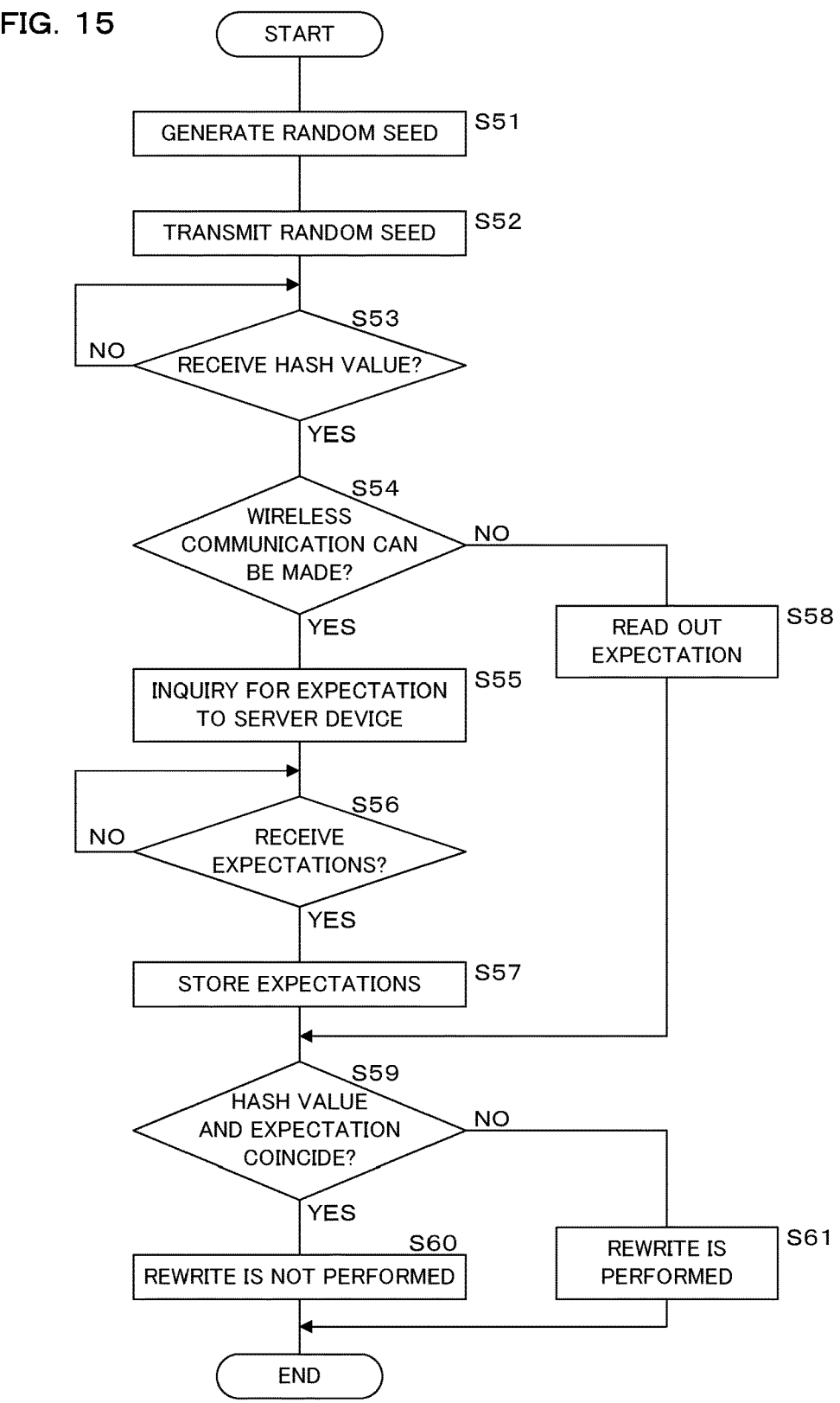
FIG. 15 is a flowchart for illustrating the process procedures of rewrite detection processing to be performed by a gateway according to Embodiment 3.

FIG. 15 is a flowchart for illustrating the process procedures of rewrite detection processing to be performed by the gateway 305 according to Embodiment 3. In predetermined timing such as when the ignition switch of the vehicle 1 is turned on, for example, the processing unit 51 of the gateway 305 generates a random seed on the basis of a random-number generation algorithm (step S51), and transmits the generated random seed to an ECU 2 to be processed (step S52). The processing unit 51 determines whether a hash value transmitted from the ECU 2 to be proceed for the random seed has been received at the wired communication unit 55 or not (step S53), and, when a hash value has not been received (S53: NO), waits until a hash value is received. When a hash value is received (S53: YES), the processing unit 51 determines whether communication of the wireless communication unit 56 with the server device 7 can be made or not (step S54).

When wireless communication can be made (S54: YES), the processing unit 51 makes an inquiry for an expectation to the server device 7 at the wireless communication unit 56 (step S55). It is to be noted that, when receiving an inquiry for an expectation from the gateway 305, the server device 7 does not transmit one expectation corresponding to one random seed to the gateway 305 but extracts all expectations related to the object ECU 2 of the vehicle 1 from the rewrite detection database 75 and transmits the expectations to the gateway 305 in Embodiment 3. The processing unit 51 of the gateway 305 determines whether expectations transmitted from the server device 7 in response to the inquiry have been received or not (step S56), and, when expectations have not been received (S56: NO), waits until expectations are received. When expectations from the server device 7 are received (S56: YES), the processing unit 51 stores all received expectations in the storage unit 52 as expectation backup information (step S57), extracts what is required from all received expectations, and proceeds the processing to step S59. When wireless communication cannot be made (S54: NO), the processing unit 51 reads out a required expectation from the expectation backup information in the storage unit 52 (step S58), and proceeds the processing to step S59.

The processing unit 51 compares the hash value received from the ECU 2 with the expectation received from the server device 7 or the expectation read out from the storage unit 52, and determines whether the hash value and the expectation coincide with each other or not (step S59). When the hash value and the expectation coincide with each other (S59: YES), the processing unit 51 determines that unauthorized rewrite has not been performed (step S60), displays notice thereof at the display unit 54, and terminates the processing. When the hash value and the expectation do not coincide with each other (S59: NO), the processing unit 51 determines that unauthorized rewrite has been performed (step S61), displays notice thereof at the display unit 54, and terminates the processing.

In the rewrite detection system according to Embodiment 3 having the above configuration, the gateway 305 having a function similar to that of the rewrite detection device 5 is mounted on the vehicle 1, and performs processing to detect unauthorized rewrite to a program or data in an ECU 2. This makes it easy to increase the frequency of detection processing by, for example, detecting unauthorized rewrite each time the engine of the vehicle 1 starts.

Moreover, when communication with the server device 7 can be made, the gateway 305 acquires expectations and stores expectations in the storage unit 52 as expectation backup information. When communication with the server device 7 cannot be made in the process of detection processing, the gateway 305 performs detection processing on the basis of the stored expectation backup information. This allows the gateway 305 to perform detection processing even when communication with the server device 7 cannot be made.

Although Embodiment 3 has a configuration wherein the gateway 305 mounted on the vehicle 1 detects unauthorized rewrite to a program or data in an ECU 2, this is not restrictive. For example, a car navigation device mounted on the vehicle 1, any one ECU 2 or the like may be configured to perform detection processing. Moreover, although the gateway 305 is configured to store expectation backup information when expectations can be acquired from the server device 7 in detection processing, this is not restrictive. The gateway 305 may acquire expectations from the server device 7 and store expectations as expectation backup information in various other timing. Moreover, the gateway 305 may be configured to perform detection processing when communication with the server device 7 can be made, and not to perform detection processing when communication cannot be made.

Since the other configuration of the rewrite detection system according to Embodiment 3 is similar to the configuration of the rewrite detection system according to Embodiment 1, like codes are attached to similar components, and detailed explanation thereof will be omitted.

[Reference Signs List]

As this invention may be embodied in several forms without departing from the spirit of essential characteristics thereof, the present embodiments are therefore illustrative and not restrictive, since the scope of the invention is defined by the appended claims rather than by the description preceding them, and all changes that fail within metes and bounds of the claims, or equivalence of such metes and bounds thereof are therefore intended to be embraced by the claims.

It is noted that, as used herein and in the appended claims, the singular form "a," "an" and "the" include plural referents unless the context clearly dictates otherwise.

What is claimed is:

1. A rewrite detection system for preventing an unauthorized rewrite of a program or data stored in a rewritable storage unit of an information processing device, wherein the rewrite detection system has a rewrite detection device comprising:
   a network communication interface configured to enable communication with the information processing device; and
   a processor programmed to:
      cause the network communication interface to transmit a random value as seed information, over the network, to the information processing device;
      receive, via the network communication interface, a hash value transmitted from the information processing device in response to the seed information being transmitted to the information processing device by the rewrite detection device;
      determine whether the received hash value is valid or not; and
      detect whether a rewrite is authorized or unauthorized in accordance with a result of the determination of whether the received hash value is valid or not, wherein the information processing device is configured to: in response to receiving the seed information transmitted by the network communication interface: (i) calculate the hash value based on the seed information transmitted by the network communication interface and the program or data stored in the rewritable storage unit of the information processing device, and (ii) transmit the calculated hash value to the rewrite detection device.

2. The rewrite detection system according to claim 1, wherein
   the processor is further programmed to: cause the network communication interface to transmit storage area specification information, which specifies a storage area in the rewritable storage unit of the information processing device, to the information processing device together with the seed information, and
   the information processing device is configured to calculate the hash value on the basis of the seed information and the program or data stored in the storage area in the rewritable storage unit of the information processing device, which is specified by the storage area specification information transmitted together with the seed information.

3. The rewrite detection system according to claim 2, wherein the processor is further programmed to: cause the network communication interface to transmit storage area specification information including information which specifies a head position and a tail position of the storage area, or a size of the storage area.

4. The rewrite detection system according to claim 2, wherein a plurality of discontinuous areas are specified as the storage area, and the processor is further programmed to: cause the network communication interface to transmit the storage area specification information including information which specifies the plurality of discontinuous areas.

5. The rewrite detection system according to claim 4, wherein the storage area specification information is information which specifies an interval between the plurality of discontinuous areas.

6. The rewrite detection system according to claim 2, wherein the information processing device is configured to not transmit the hash value to the rewrite detection device when the storage area specification information received together with the seed information does not satisfy a predetermined condition.

7. The rewrite detection system according to claim 6, wherein the information processing device is configured to not transmit the hash value to the rewrite detection device when a size of the storage area specified by the storage area specification information is neither a predetermined size nor a size of a constant multiple of the predetermined size.

8. The rewrite detection system according to claim 1, wherein
the information processing device is further configured to determine a storage area in the rewritable storage unit to be an object of hash value calculation on the basis of the seed information transmitted by the network communication interface, and
the processor is further programmed to: calculate the hash value on the basis of the program or data stored in the storage area that is determined to be the object of the hash calculation on the basis of the seed information.

9. The rewrite detection system according to claim 1, wherein the information processing device is configured to not transmit the hash value until a predetermined period of time has elapsed since a previous hash value was transmitted to the rewrite detection device.

10. The rewrite detection system according to claim 1, wherein the rewritable storage unit stores random data in a surplus area other than a storage area where the program or data is stored.

11. The rewrite detection system according to claim 1, wherein the rewrite detection device processor is further programmed to:
measure a period of time from transmission of the seed information by the network communication interface to reception of the hash value by the network communication interface,
detect the rewrite in accordance with the measured period of time.

12. The rewrite detection system according to claim 1, further comprising a server device having another network communication interface, the server device being configured to cause the another network communication interface to: transmit an expectation of the hash value for the seed information, wherein the processor is further programmed to:
cause the network communication interface to transmit, to the server device, an inquiry for the expectation of the hash value for the seed information,
receive the expectation of the hash value transmitted from the server device in response to transmitting the inquiry,
determine whether the hash value received by the network communication interface is valid or not on the basis of the expectation received by the network communication interface.

13. The rewrite detection system according to claim 1, further comprising a server device having another network communication interface, the server device being configured to cause the another network communication interface to: transmit the seed information and an expectation of the hash value, wherein the processor is further programmed to:
cause the network communication interface to transmit, to the server device, an inquiry for the seed information and the expectation of the hash value,
receive the seed information and the expectation of the hash value in response to transmitting the inquiry,
determine whether the hash value received by the network communication interface is valid or not on the basis of the expectation received by the network communication interface.

14. The rewrite detection system according to claim 11, wherein
the rewrite detection device is mounted on a mobile body, and
the processor is further programmed to:
when communication with the server device can be made, cause the network communication interface to transmit the inquiry,
when the network communication interface receives the expectation of the hash value, store the received expectation of the hash value, and
determine whether the hash value received by the network communication interface is valid or not on the basis of the stored expectation of the hash value.

15. The rewrite detection system according to claim 12, wherein
the rewrite detection device is mounted on a mobile body, and
when communication with the server device can be made, cause the network communication interface to transmit the inquiry,
when the network communication interface receives the expectation of the hash value, store the received expectation of the hash value, and
determine whether the hash value received by the network communication interface is valid or not on the basis of the stored expectation of the hash value.

16. The rewrite detection system according to claim 1, wherein the rewrite detection device is mounted on a mobile body.

17. The rewrite detection system according to claim 1, herein the rewrite detection device is configured to be attachable to and detachable from the network.

18. A rewrite detection device for preventing an unauthorized rewrite of a program or data stored in a rewritable memory of an information processing device, the rewrite detection device comprising:
a network communication interface configured to enable communication with the information processing device; and
a processor programmed to:
cause the network communication interface to transmit a random value as seed information, over the network, to the information processing device;
receive, via the network communication interface, a hash value transmitted from the information processing device in response to the seed information being transmitted to the information processing device by the rewrite detection device;
determine whether the received hash value is valid or not; and
detect whether a rewrite is authorized or unauthorized in accordance with a result of the determination of whether the received hash value is valid or not, wherein the information processing device is configured to: in response to receiving the seed information transmitted by the network communication interface: (i) calculate the hash value based on the seed information transmitted by the network communication interface and the program or data stored in the rewritable memory of the information processing device, and (ii) transmit the calculated hash value to the rewrite detection device.

19. An information processing device for preventing an unauthorized rewrite, the information processing device comprising:
   a network communication interface configured to enable communication with a rewrite detection device;
   a rewritable memory that stores a program or data; and
   a processor programmed to:
      in response to receiving a random value transmitted as seed information from the rewrite detection device:
      calculate a hash value based on the received seed information and the program or data stored in the rewritable memory, and
      cause the network communication interface to transmit the calculated hash value to the rewrite detection device, wherein the rewrite detection device is configured to: in response to receiving the hash value transmitted by the network communication interface: (i) determine whether the received hash value is valid or not, and (ii) detect whether a rewrite is authorized or unauthorized in accordance with a result of the determination of whether the received hash value is valid or not.

* * * * *